United States Patent
Sinha et al.

(10) Patent No.: US 11,295,233 B2
(45) Date of Patent: Apr. 5, 2022

(54) MODELING TIME TO OPEN OF ELECTRONIC COMMUNICATIONS

(71) Applicant: Adobe Inc., San Jose, CA (US)

(72) Inventors: Moumita Sinha, Bangalore (IN);
Vishwa Vinay, Bangalore (IN);
Harvineet Singh, Ludhiana (IN);
Frederic Mary, Maisons-Alfort (FR)

(73) Assignee: Adobe Inc., San Jose, CA (US)

( * ) Notice: Subject to any disclaimer, the term of this patent is extended or adjusted under 35 U.S.C. 154(b) by 1139 days.

(21) Appl. No.: 15/808,171

(22) Filed: Nov. 9, 2017

(65) Prior Publication Data

US 2019/0138944 A1    May 9, 2019

(51) Int. Cl.
| G06N 20/00 | (2019.01) |
| H04L 51/234 | (2022.01) |
| H04L 51/18 | (2022.01) |

(52) U.S. Cl.
CPC .............. *G06N 20/00* (2019.01); *H04L 51/18* (2013.01); *H04L 51/34* (2013.01)

(58) Field of Classification Search
CPC ........ G06N 20/00; G06N 7/005; H04L 51/18; H04L 51/34
See application file for complete search history.

(56) References Cited

U.S. PATENT DOCUMENTS

| 2003/0229673 A1* | 12/2003 | Malik | ................ H04L 12/1818 709/207 |
| 2015/0134304 A1* | 5/2015 | Guiver | ................... G06N 7/005 703/2 |

OTHER PUBLICATIONS

Barbieri et al., "Improving Post-Click User Engagement on Native Ads via Survival Analysis", Apr. 2016, WWW'16: Proceedings of the 25th International Conference on World Wide Web, pp. 761-770 (Year: 2016).*

DiCastro et al., "You've got Mail, and Here is What you Could do With It! Analyzing and Predicting Actions on Email Messages", Feb. 25, 2016, WSDM'16, pp. 307-316 (Year: 2016).*

Branders et al., "A mixture Cox-Logistic model for feature selection from survival and classification data", Feb. 2015, arXiv: 1502. 01493v1, pp. 1-6 (Year: 2015).*

Mair et al., "Session Clustering Using Mixtures of Proportional Hazards Models", Mar. 2008, Research Report Series / Department of Statistics and Mathematics, 63. Department of Statistics and Mathematics, WU Vienna University of Economics and Business, Vienna, pp. 1-14 (Year: 2008).*

(Continued)

*Primary Examiner* — Abdullah Al Kawsar
*Assistant Examiner* — Brent Johnston Hoover
(74) *Attorney, Agent, or Firm* — Keller Jolley Preece

(57) ABSTRACT

The present disclosure relates applying a survival analysis to model when a particular recipient will view an electronic message. For example, one or more embodiments train a survivor function to model the time that will elapse, on a continuous scale, before a recipient will open an electronic message. For example, one or more embodiments involve accessing analytics training data and extracting a first set of features affecting the time that elapsed before past recipients opened an electronic message and a second set of features affecting whether the recipients opened the electronic message at all. The system then generates a mixture model modified survivor function and determines the effect of each feature set on its corresponding outcome to learn parameters for the mixture model modified survivor function.

20 Claims, 10 Drawing Sheets

(56) References Cited

OTHER PUBLICATIONS

Shar VanBoskirk, CS Overby, and S Takvorian. 2011. US interactive marketing forecast 2011 to 2016, Forrester Research. (2011).
G Tsirulnik. 2011. British Airways mobile email campaign garners 250K app downloads. http://www.mobilemarketer.com/ex/mobilemarketer/cms/news/ email/9056.html. (2011).
Andre' Bonfrer and Xavier Dre'ze. 2009. Real-time evaluation of e-mail campaign performance. Marketing Science 28, 2 (2009), 251-263.
Liu Yang, Susan Dumais, Paul Bennett, and Ahmed Hassan Awadallah. 2017. Characterizing and Predicting Enterprise Email Reply Behavior. In Proceedings of the 40th Annual International ACM SIGIR Conference on Research and Development in Information Retrieval (SIGIR 2017). ACM.
Sattar Ameri, Mahtab J. Fard, Ratna B. Chinnam, and Chandan K. Reddy. 2016. Survival Analysis Based Framework for Early Prediction of Student Dropouts. In Proceedings of the 25th ACM International on Conference on Information and Knowledge Management (CIKM '16). ACM, New York, NY, USA, 903-912. DOI: h ttp://dx.doi.org/10.1145/2983323.2983351.
Samuel Branders, Roberto D'Ambrosio, and Pierre Dupont. 2015. A mixture Cox-Logistic model for feature selection from survival and classication data. arXiv preprint arXiv:1502.01493 (2015).
Sunandan Chakraborty, Filip Radlinski, Milad Shokouhi, and Paul Baecke. 2014. On Correlation of Absence Time and Search Effectiveness. In Proceedings of the 37th International ACM SIGIR Conference on Research & Development in Information Retrieval (SIGIR '14). ACM, New York, NY, USA, 1163-1166. DOI: htt p://dx.doi.org/10.1145/2600428.2609535.
Anurat Chapanond, Mukkai S Krishnamoorthy, and Bulent Yener. 2005. Graph theoretic and spectral analysis of Enron email data. Computational & Mathematical Organization Theory 11, 3 (2005), 265-281.
Gordon V. Cormack. 2008. Email Spam Filtering: A Systematic Review. In Foundations and Trends in Information Retrieval, vol. 1.
DR Cox. 1972. Regression models and life tables. Journal of the Royal Statistical Society 34 (1972), 187-220.
Laura Dabbish, Gina Venolia, and JJ Cadiz. 2003. Marked for Deletion: An Analysis of Email Data. In CHI '03 Extended Abstracts on Human Factors in Computing Systems (CHI EA '03). ACM, New York, NY, USA, 924-925. DOI: htt p://dx.doi.org/10.1145/765891.766073.
Dotan Di Castro, Zohar Karnin, Liane Lewin-Eytan, and Yoelle Maarek. 2016. You've Got Mail, and Here is What You Could Do With It!: Analyzing and Predicting Actions on Email Messages. In Proceedings of the Ninth ACM International Conference on Web Search and Data Mining (WSDM '16). ACM, New York, Ny, USA, 307-316. DOI:h ttp://dx.doi.org/10.1145/2835776.2835811.
Tim Drye, Graham Wetherill, and Alison Pinnock. 2001. When are customers in the market? Applying survival analysis to marketing challenges. Journal of Targeting, Measurement and Analysis for Marketing 10, 2 (2001), 179-188.
Nicolas Ducheneaut and Victoria Belloi. 2001. E-mail as habitat: an exploration of embedded personal information management, interactions 8, 5 (2001), 30-38.
Miles Efron. 2012. Query-specific recency ranking: Survival analysis for improved microblog retrieval. In Proceedings of the TAIA-12 Workshop associated to SIGIR-12. Citeseer.
Vern T Farewell. 1982. The use of mixture models for the analysis of survival data with long-term survivors. Biometrics (1982), 1041-1046.

Patricia M Grambsch and Terry M Therneau. 1994. Proportional hazards tests and diagnostics based on weighted residuals. Biometrika (1994), 515-526.
Eric Horvitz, Andy Jacobs, and David Hovel. 1999. Attention-sensitive Alerting. In Proceedings of the Fifteenth Conference on Uncertainty in Artificial Intelligence (UAI'99). Morgan Kaufmann Publishers Inc., San Francisco, CA, USA, 305-313. http://dl.acm.org/citation.cfm?id=2073796.2073831.
Edward L Kaplan and Paul Meier. 1958. Nonparametric estimation from incomplete observations. Journal of the American statistical association 53, 282 (1958), 457-481.
Thomas Karagiannis and Milan Vojnovic. 2009. Behavioral Profiles for Advanced Email Features. In Proceedings of the 18th International Conference on World Wide Web (WWW '09). ACM, New York, NY, USA, 711-720. DOI:http://dx.doi.org/10.1145/1526709.1526805.
Bryan Klimt and Yiming Yang. 2004. The Enron Corpus: A New Dataset for Email Classification Research. Springer Berlin Heidelberg, Berlin, Heidelberg, 217-226. DOI:http://dx.doi.org/10.1007/978-3-540-30115-8 22.
V. Kumar, Xi (Alan) Zhang, and Anita Luo. 2014. Modeling Customer Opt-In and Opt-Out in a Permission-Based Marketing Context. Journal of Marketing Research 51, 4 (2014), 403-419. DOI:http://dx.doi.org/10.1509/jmr.13.0169 arXiv:http://dx.doi.org/10.1509/jmr.13.0169.
Matthew Lease, Vitor R. Carvalho, and Emine Yilmaz. 2011. Crowdsourcing for Search and Data Mining. SIGIR Forum 45, May 1, 2011, 18-24. DOI:http://dx.doi.org/10.1145/1988852.1988856.
Jeong-Yoon Lee, Hang Zhang, and Valery A Petrushin. 2012. Survival Analysis for Marketing. https://pdfs.semanticscholar.org/2360/bb9ea10622c8c21595ade8f43cc237aac230.pdf, (2012). [Online; accessed Mar. 15, 2017].
Yan Li, Jie Wang, Jieping Ye, and Chandan K Reddy. 2016. A multi-task learning formulation for survival analysis. In Proceedings of the 22nd ACM SIGKDD International Conference on Knowledge Discovery and Data Mining. ACM, 1715-1724.
Junxiang Lu. 2003. Modeling customer lifetime value using survival analysis—an application in the telecommunications industry. Data Mining Techniques (2003), 120-128.
Kanika Narang, Susan T. Dumais, Nick Craswell, Dan Liebling, and Qingyao Ai. 2017. Large-Scale Analysis of Email Search and Organizational Strategies. In Proceedings of the 2017 Conference on Conference Human Information Interaction and Retrieval (CHIIR'17). ACM, New York, NY, USA, 215-223. DOI:http://dx.doi.org/10.1145/3020165.3020175.
Rajesh Ranganath, Adler Perotte, Noemie Elhadad, and David Blei. 2016. Deep Survival Analysis. In Proceedings of the 1st Machine Learning for Healthcare Conference. 101-114.
Greg Ridgeway. 1999. The State of Boosting. (1999).
Jian Wang and Yi Zhang. 2013. Opportunity model for e-commerce recommendation: right product; right time. In Proceedings of the 36th international ACM SIGIR conference on Research and development in information retrieval. ACM, 303-312.
Steve Whittaker and Candace Sidner. 1996. Email overload: exploring personal information management of email. In Proceedings of the SIGCHI conference on Human factors in computing systems. ACM, 276-283.
Hui Zou and Trevor Hastie. 2005. Regularization and variable selection via the elastic net. Journal of the Royal Statistical Society: Series B (Statistical Methodology) 67, 2 (2005), 301-320.

* cited by examiner

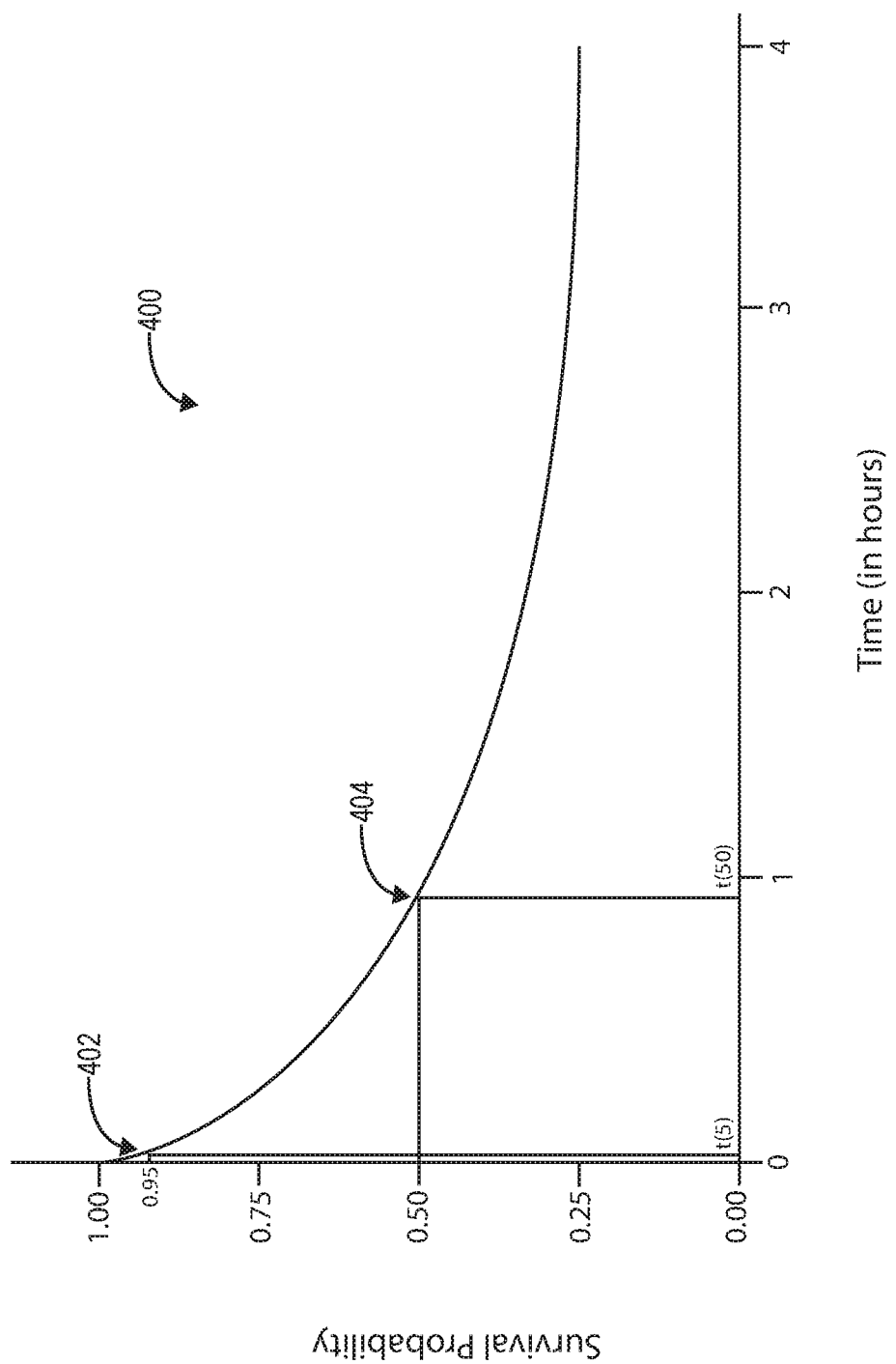

| Model | Censoring Window – 3 Hours | | | | Censoring Window – 6 Hours | | | | Censoring Window – 12 Hours | | | |
|---|---|---|---|---|---|---|---|---|---|---|---|---|
| | B | LR | CPH-L | CPH-G | MM | B | LR | CPH-L | CPH-G | MM | B | LR | CPH-L | CPH-G | MM |
| AUC | 0.863 | 0.931 | 0.931 | 0.932 | 0.929 | 0.870 | 0.939 | 0.939 | 0.940 | 0.938 | 0.878 | 0.948 | 0.948 | 0.949 | 0.948 |
| MRAD(A) | 1.226 | N/A | 1.085 | 0.941 | 0.483 | 2.504 | N/A | 1.835 | 1.372 | 0.678 | 5.079 | N/A | 1.707 | 1.572 | 1.318 |
| MRAD(O) | 26.641 | N/A | 11.953 | 12.217 | 9.499 | 40.602 | N/A | 23.245 | 14.788 | 9.832 | 62.740 | N/A | 19.831 | 28.978 | 15.657 |

Fig. 6

MODELING TIME TO OPEN OF ELECTRONIC COMMUNICATIONS

BACKGROUND

Electronic messaging is an important tool for communication that allows parties to exchange instantaneous written communication. Additionally, there is a great variety of contexts in which electronic messaging is useful. Some examples include sending e-mail messages to co-workers or employees within an office setting to facilitate operation of a business, sending a text message to a friend or acquaintance for social interaction, and sending marketing materials to potential customers. Further, an electronic messaging system may allow a user to disseminate information to a large group of people or entities at a low cost and with minimal effort. For example, by using an electronic messaging system, a marketer may send an advertisement or other marketing material to a selected set of consumers without using printed ads, which require expenditures for both printing and mailing.

Because of the many benefits associated with electronic messaging, its use increases significantly every year. Consequently, recipients receive greater amounts of messages on a daily basis and often become overwhelmed with the amount of information presented to them. As a result, many recipients choose to view only those messages that are a high priority, leaving many deleted, unopened, or unviewed until the relevance of the message has passed.

This poses problems for the sender of the electronic message. For example, a marketer may send promotional content to a large consumer base in hopes of generating interest in a product or sale. However, if a recipient considers the message to be a low priority, the recipient is unlikely to view the message and the marketer will be unable to generate the desired interest. More particularly, a marketer may send a time-sensitive message regarding a flash sale to an exclusive costumer list in an effort to quickly sell a product in limited supply. Because the list of recipients is exclusive, the campaign will be unsuccessful if the recipients do not view the message within the limited time frame of the sale.

To circumvent these issues, a sender of an electronic message may increase the list of recipients in hopes of reaching more customers that will view the message. However, this approach risks overexposure, which may irritate consumers, leading them to unsubscribe or otherwise disengage from interacting with the sender.

SUMMARY

One or more embodiments described herein provide benefits and/or solve one or more of the foregoing or other problems in the art with systems, methods, and computer readable storage media that apply a survival analysis to model when a particular recipient will view an electronic message. In one or more embodiments, the systems, methods, and computer readable storage media train a survivor function to model the time that will elapse, on a continuous scale, before a potential future recipient will open an electronic message. For example, one or more embodiments involve accessing analytics training data and extracting a first set of features affecting the time that elapsed before a past recipient opened an electronic message and a second set of features affecting whether the recipient opened the electronic message at all. The systems, methods, and computer readable storage media then generate a mixture model modified survivor function and determine the effect of each feature set on its corresponding outcome to learn parameters for the mixture model modified survivor function. The trained mixture model modified survivor function allows a sender to determine and focus on recipients that will view a message within a given time frame, providing the ability to optimize a recipient list for time-sensitive messages.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 4A-4B each illustrate a graph plotting the survival function of an example potential recipient in accordance with one or more embodiments;

FIG. 6 illustrates a data table summarizing and comparing test results of several modeling systems in accordance with one or more embodiments;

DETAILED DESCRIPTION

Figure 1:
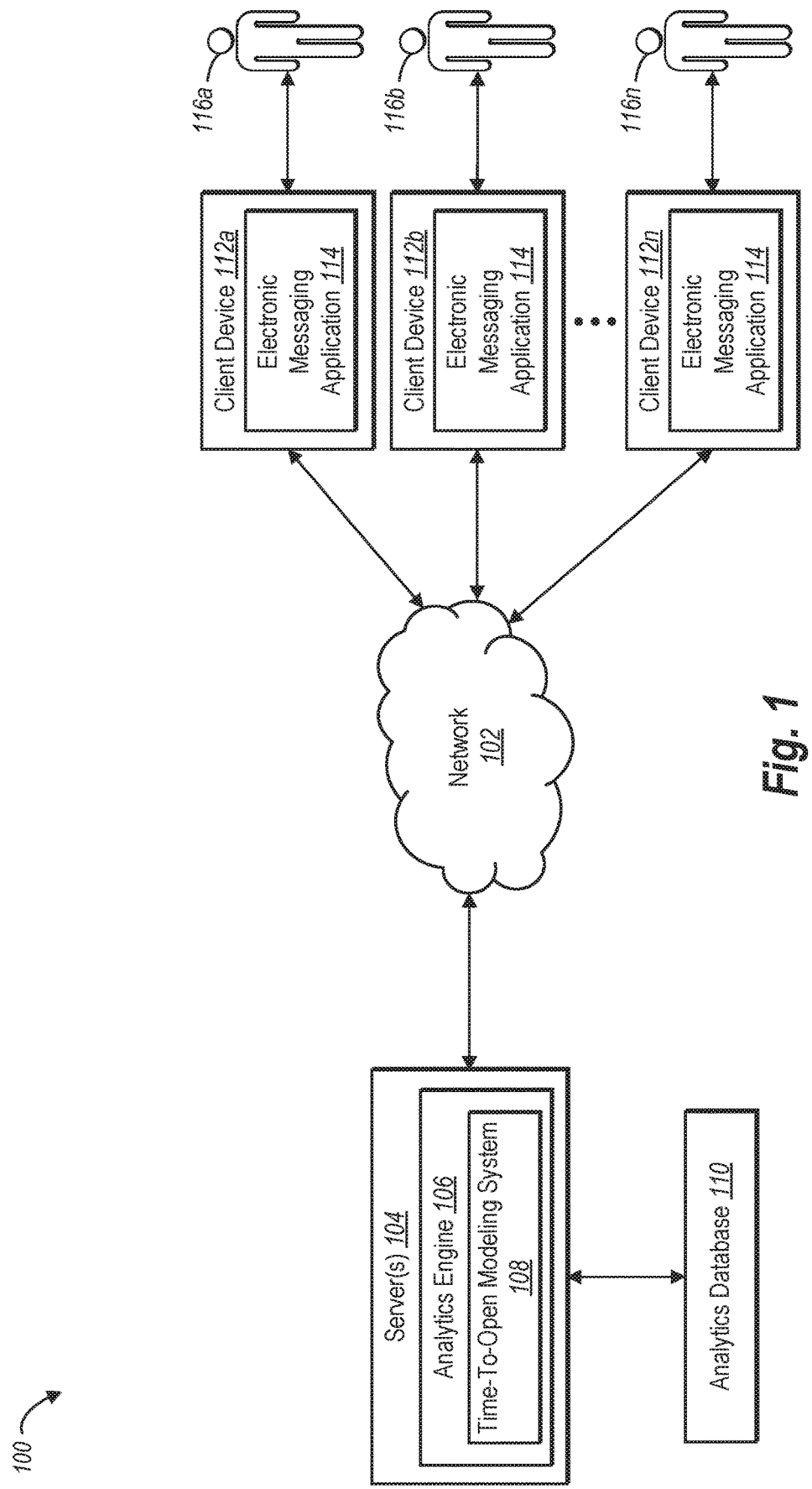
FIG. 1 illustrates a schematic diagram of an example environment in which a time-to-open modeling system can operate in accordance with one or more embodiments.

One or more embodiments described herein include a time-to-open modeling system for estimating a time interval that will elapse before a potential recipient opens an electronic message (i.e., a time-to-open) based on features associated with the potential recipient. In particular, the time-to-open modeling system trains a survivor function to estimate a time to open on a continuous scale. The time-to-open modeling system then uses the trained survivor function to estimate, on a per user basis, whether a user will open an electronic message and when the user will open the electronic message.

More particularly regarding training, in one or more embodiments, the time-to-open modeling system accesses analytics training data, associated with past recipients of electronic messages. The time-to-open modeling system then parses the analytics training data and extracts a first set of features that affected the time that elapsed before the past recipients opened an electronic message. The time-to-open modeling system further extracts outcome data that indicates whether or not the past recipients opened the electronic message and, if so, the time-to-open. The time-to-open modeling system then estimates parameters for the survival function using the extracted data to generate a trained survival function.

Survival analysis is an area of statistical modeling primarily interested in modeling the time to an event. By using survival analysis, the time-to-open modeling system estimates a survival probability—a probability that an individual will survive beyond a time t (i.e., not experience an event of interest by t). Historically, the event of interest was the death of medical patients; however, the time-to-open modeling system adapts survival analysis for an event of opening an electronic message by a recipient. In other words, the time-to-open modeling system uses survival analysis to estimate a probability the recipient of an electronic message will not open the message before a time t.

More particularly, the time-to-open modeling system may also estimate the hazard of a recipient. In the context of electronic messages, the hazard of a recipient represents the probability that, given the recipient has yet to experience the event by time t, the recipient will experience the event instantaneously after time t. The hazard function is related to the survivor function, and this relationship may be expressed mathematically to show the survival probability's dependence on the hazard.

In one or more embodiments, the time-to-open modeling system uses the hazard function to model a recipient's hazard. In other words, the hazard function incorporates the hazard's dependence on the first set of features extracted from the analytics data. The relationship between the survival function and the hazard function may then be used to incorporate the effect of the first set of features into the survival probability.

Due to the origins of survival analysis, hazard functions generally assume that all individuals will eventually experience the event. However, this is not the case in the context of electronic messages as many recipients will delete or otherwise not view/open the received message. The time-to-open modeling system modifies the survival analysis to account for those recipients who are expected to never open the electronic message. The time-to-open modeling system determines the probability that a particular recipient will open a received electronic message based on the second set of features extracted from the analytics data. The time-to-open modeling system introduces this probability into the survival function as a mixture probability so the time-to-open for a particular recipient is dependent on both features that affect whether the particular recipient is likely to open the received message and features that affect the time in which the particular recipient will open the message.

The mixture probability allows the survivor function to distinguish between potential future recipients who are likely to open the electronic message and those who are not. In such embodiments, the time-to-open modeling system extracts a second set of features from the analytics training data that affected whether the past recipients opened the message at all. The time-to-open modeling system then applies the mixture model modification to the survival function. The mixture model modified survivor function allows the time-to-open modeling system to distinguish between those recipients who are likely to open the electronic message and those who are not likely to open the electronic message Further, the time-to-open modeling system estimates parameters associated with the first and second sets of features, using the mixture model modified survivor function. In particular, these parameters are estimated by maximizing the likelihood of the data extracted from the analytics training data. By extracting the data, formulating the mixture probability, and estimating the parameters associated with the first and second feature sets, the time-to-open modeling system trains a survivor function for future modeling.

Subsequently, the time-to-open modeling system may apply the trained survivor function to model the time that will elapse before a potential recipient will open an electronic message. To accomplish this, the time-to-open modeling system accesses an analytics database comprising data associated with the potential recipient. The time-to-open modeling system then parses through the analytics data related to the potential recipient and extracts a first set of features that affects a time in which the potential recipient will open the message. Further, the time-to-open modeling system extracts a second set of features that affects whether the potential recipient will open the electronic message at all. In one or more embodiments, the features extracted for the potential recipient correspond to at least some of the features extracted for past recipients to train the survivor function. The time-to-open modeling system then applies the extracted feature sets to the trained survivor function, which incorporates the earlier determined parameters for each feature set. By way of the analysis, the time-to-open modeling system provides the probability that the potential recipient will not open the message by a specified time. Additionally, the time-to-open modeling system provides the probability that the potential recipient will open the electronic message at all. By using the trained survivor function to determine the probabilities at varying times, the time-to-open modeling system may construct a survival curve over a continuous time scale, from which the time-to-open modeling system may estimate when the potential recipient is likely to open the electronic message.

The time-to-open modeling system provides several advantages over conventional systems related to the distribution of electronic messages. For example, through incorporating a mixture modeling approach into the survival analysis, the time-to-open modeling system can distinguish between potential recipients who are likely to open the electronic message and those who are not likely to open the message. To illustrate this advantage, a potential recipient may possess features that indicate that the potential recipient opens most electronic messages soon after they are received but may also possess features that indicate the potential recipient is not likely to view a particular electronic message, whether the disinclination is due to the general content of the message, the identity of the sender, or some other reason. If the sender of the particular electronic message only looked at analytics data indicating how quickly the potential recipient tends to view electronic messages, the sender may elect to send the particular electronic message to the potential recipient even though the potential recipient is unlikely to open that particular message. Thus, the sender risks sending the electronic message to a list of recipients that will never open the message, failing to generate the desired interest or engagement. By incorporating a mixture model approach to separate out potential recipients who are not likely to view the electronic message, the sender may generate a more effective recipient list.

Further, the time-to-open modeling system can provide a time-to-open on a continuous scale of time. This provides more precise information than prior art systems and allows the sender to make more informed decisions regarding potential recipients. For example, providing information on a continuous scale of time allows the sender to determine which potential recipients are most likely to open an electronic message within a given time frame. It also allows the sender to see the probability of when a particular recipient will open the message for any given point in time. With this information, the sender may easily adjust the timing of the electronic message to engage the desired number of recipients.

Additionally, because the sender of the electronic message is able to create a more effective list of recipients, the sender may avoid problems resulting from bandwidth and processing limitations. More specifically, because a recipient list may exclude potential recipients who are unlikely to view the message, the list will be smaller and more easily processed by the applicable computing device(s). Further, a network with limited bandwidth is able to send an electronic message to a smaller recipient list more quickly and efficiently.

As used herein, the term "electronic message" refers to electronic content that may be transferred to, or from, one or more electronic devices. In particular, electronic message refers to electronic content that may be sent to or received by way of a network or other communications connection (either hardwired, wireless, or a combination of hardwired or wireless). For instances, electronic messages may include, but are not limited to, emails, text messages, digital advertisements, instant messages, social media messages, and notifications sent to an electronic device (such as in-app notifications).

Additionally, as used herein, the term "analytics training data" refers to data used to train a survivor function to predict a time-to-open for potential recipients of an electronic message. In particular, analytics training data refers to data associated with past recipients of electronic messages that is relevant to training the survivor function. For instance, analytics training data can include, but is not limited to, data relating to features/attributes of the past recipients that affected how the recipients interacted with an electronic message, as well as data describing those interactions (e.g., whether the recipients opened the message and, if so, the time that elapsed before the message was opened). Further, analytics training data may include data that was provided directly by the past recipients and/or data obtained from tracking the recipients' interactions with electronic messages.

Moreover, as used herein, the term "analytics data" refers to data associated with a potential recipient of an electronic message. For instance, analytics data can include, but is not limited to features that affect how the potential recipient will interact with the electronic message (e.g., whether the potential recipient will open the message and, if so, the time that will elapse before the potential recipient opens the message). Further, analytics data may include data that was provided directly by the potential recipient and/or data obtained by tracking the potential recipient's interactions with prior electronic messages. Analytics data can include data relating to features/attributes of the potential recipient and/or their network history and interactions with electronic messages.

As used herein, the term "feature" refers to user actions or other measurable attributes that may occur within a network environment, such as a web page or native application. Some examples of metrics include, but are not limited to, web page lands, video completes, link clicks, revenue generated by the website, number of units sold, number of prior visits by visitors, number of clicks by visitors, number of logins, length of visits, etc. Features can also include attributes of a user or a computing device. For example, attributes can include gender, location of a user or computing device, device or operating system type, etc.

As used herein, the term "survival analysis" refers to an area of statistical modeling where the main variable of interest is the time to an event. In the context of the present disclosure, the event of interest is the opening of an electronic message by the recipient. Further, as used herein, the term "survival time," refers to the time that elapses before the event is experienced. In particular, as used herein, survival time refers to the time interval that elapses between the time when the recipient receives the electronic message and the time when the recipient opens the electronic message. Survival time may also be referred to as "time-to-open."

Moreover, as used herein, the term "survivor function" refers to a function representing the probability that an individual will survive beyond a time t (i.e., not experience the event before time t). In particular, the survivor function represents the probability that a recipient will not open an electronic message by a time t. The probability that an individual will survive beyond a time t is referred to as the "survival probability."

Additionally, as used herein, the term "survival curve" represents the results of the survivor function plotted over a continuous time scale. In particular, the survival curve represents the survival probability (i.e., the probability the recipient will not open an electronic message by a time t) for every value of time t. Further, as used herein, the term "continuous time scale" or "continuous scale" refers to a scale in which the variable, time, ranges over a real number line (i.e., a time interval), or depending on the context, over some subset of the time interval.

Moreover, as used herein, the term "hazard function" refers to a function providing a "hazard" of a recipient. As used herein, a "hazard" represents the probability that, given a recipient has yet to open an electronic message by time t, the recipient will open the electronic message instantaneously after time t. Additionally, the "global baseline hazard" or "baseline hazard" refers to a global quantity that incorporates a dependence on time into the hazard function. Further, the term "relative hazard" refers to parameterized function incorporating the dependence of an individual's hazard on that individual's features.

A "mixture model" or "joint model" refers to a probabilistic model that accounts for subpopulations included within an overall population. As part of the survival analysis framework disclosed herein, the mixture model accounts for the subpopulations. For example, a mixture model can account for potential recipients of electronic messages who will not open a received electronic message and those potential recipients who will open the electronic message, which subpopulations are both included within the overall population of potential recipients of an electronic message. Similarly, when modeling data of past recipients, the mixture model accounts for the subpopulations of those recipients who were predicted to open a received electronic message and those recipients who were predicted not to, which subpopulations are both included within the overall population of those who received an electronic message.

Referring now to the figures, FIG. 1 illustrates an embodiment of an environment 100 in which a time-to-open modeling system 108 operates. Specifically, the environment 100 includes server(s) 104, an analytics database 110, and client devices 112a-112n associated with users 116a-116n communicating over a network 102. Although the environment 100 of FIG. 1 is depicted as having various components, the environment 100 may have any number of additional or alternative components (e.g., any number of servers, client devices, databases, or other components in communication with the time-to-open modeling system 108 via the network 102). Accordingly, the time-to-open modeling system 108 can analyze data from any number of databases to predict a time-to-open of an electronic message by a potential recipient. Furthermore, more than one component or entity in the environment 100 can implement the operations of the time-to-open modeling system 108 described herein. To illustrate, the time-to-open modeling system 108 can alternatively be implemented on the user client devices 112a-112n and/or be part of another component or system.

According to one or more embodiments, the time-to-open modeling system 108 can be implemented in another system, such as an analytics engine 106. Although FIG. 1 illustrates the time-to-open modeling system 108 as part of the analytics engine 106, the time-to-open modeling system 108 can be part of another system, or part of a plurality of systems.

The analytics engine 106 can collect analytics data associated with various services, such as services provided to the users 116a-116n of the client devices 112a-112n. For example, the analytics engine 106 can collect, from the server(s) 104, analytics data related to user interactions with an electronic message, such as whether the user opened the electronic message, the time that elapsed before the user opened the messages, and various features that affected those interactions. The analytics engine 106 tracks the analytics data in a variety of ways. For example, in one or more embodiments, the analytics engine 106 causes the server device(s) 104 and/or third-party server to track user data (e.g., user behavioral data) and report the tracked user data for storage on the analytics database 110. In one or more embodiments, the analytics engine 106 receives tracked interaction data directly from the contact devices 112a-n via data stored on the contact devices 112a-n (e.g., browser cookies, cached memory), embedded computer code (e.g., tracking pixels), a user profile, or using various types of tracking techniques. Thus, the analytics engine 106 collects or otherwise receives tracked interaction data including information about various types of interactions with respect to the users 116a-n associated with the respective interactions. As the users 116a-n of the contact devices 112a-n experience or otherwise participate in interactions, the analytics engine 106 collects and compiles interaction data including information associated with each of the respective interactions.

In one or more embodiments, the time-to-open modeling system 108 performs operations associated with estimating a time interval that will elapse before a potential recipient opens an electronic message based on analytics data stored in one or more databases (e.g., the analytics database 110). For example, the time-to-open modeling system 108 extracts, from the analytics database 110, analytics data associated with a potential recipient of an electronic message and constructs a survival curve that estimates a probability that the potential recipient will not open the electronic message by a specified time. Additionally, the time-to-open modeling system 108 estimates a probability that the potential recipient will open the electronic message at all, allowing differentiation between those potential recipients who would be prone to opening the electronic message and those not prone to do so. By extracting analytics data associated with users 116a-116n, the time-to-open modeling system 108 can predict which of the users 116a-116n, if sent an electronic message, are likely to open the message and how much time would elapse before they do so. Consequently, an electronic message sender may use the time-to-open modeling system 108 to send the message to those who are most likely to open the message within a desired time frame.

In one or more embodiments, the server(s) 104 may manage, generate, receive, and transmit any type of data associated with estimating a time-to-open. For example, the server(s) 104 can manage analytics data used to model a time-to-open for potential recipients of an electronic message. This analytics data may be provided to the server(s) 104 directly by the potential recipients (i.e., the users 116a-116n) via client devices 112a-112n. For example, the users 116a-116n may fill out a survey provided by the server(s) 104 or create a profile on an electronic messaging application 114, accessed through the client devices 112a-112n, that communicates with the server(s) 104 by way of a network 102. Additionally, or alternatively, the server(s) 104 may obtain this data by tracking the interactions of the users 116a-116n with previous electronic messages. For example, the server(s) 104 may keep track of a particular user's past open rate, which electronic messages the user is more likely to open, and the average time that elapses before the user opens a message. Though FIG. 1 illustrates that the analytics data is stored on the analytics database 110, the analytics data may alternatively be stored on the server(s) 104.

Additionally, the server(s) 104 can manage training analytics data used to train a survivor function, implemented by the time-to-open modeling system 108, to estimate a time that will elapse before a potential recipient will open an electronic message. The training analytics data comprises data associated with past recipients of electronic messages. In one or more embodiments, the past recipients are the same as the potential recipients mentioned above. The analytics training data may also be stored on the analytics database 110 or alternatively on the server(s) 104.

In one or more embodiments, the analytics database 110 stores all analytics training data relevant to training a survivor function to estimate a time-to-open for a potential recipient of an electronic message. The training analytics data comprises data associated with past recipients of electronic messages and may include data relating to features that affected the past recipients' interactions with the electronic messages, as well as data describing those interactions. For example, the analytics training data may include features of the past recipients that affected whether or not the recipients opened the electronic messages, as well as data indicating whether or not the recipients opened the messages. Additionally, the analytics database 110 can store analytics data associated with a potential recipient of an electronic message. More particularly, the analytics database 110 can store data that will affect how a potential recipient interacts with an electronic message.

As illustrated in FIG. 1, the analytics database 110 may be embodied as a separate component; as such, it may communicate with the server(s) 104 through any suitable communications protocol. Though FIG. 1 illustrates the analytics database 110 configured to communicate with the server(s) 104 directly, one or more embodiments may configure the analytics database to communicate with the server(s) 104 through the network 102. Additionally, FIG. 1 illustrates the analytics database 110 as a separate component; however, the analytics database 110 may be integrated into another component, such as the server(s) 104.

In one or more embodiments, the time-to-open modeling system 108 uses the analytics training data stored within the analytics database 110 to train a survivor function to estimate a time-to-open for a potential recipient of an electronic message. More particularly, the time-to-open modeling system 108 may extract, from the analytics training data, data associated with past recipients of electronic messages (e.g., feature data, outcome data, etc.) and use that data to generate a mixture model modified survivor function and learn the parameters of that model. Further, after the survivor function is trained, the time-to-open modeling system 108 can extract, from the analytics database 110, analytics data associated with a potential recipient of an electronic message (e.g., feature data). The time-to-open modeling system 108 can then use the extracted analytics data to estimate a time-to-open for the potential recipient. Additionally, the time-to-open modeling system 108 can use the extracted analytics data to distinguish between those potential recipients who are prone to open the electronic message and those are not prone to do so.

In one or more embodiments, the client devices 112a-112n include a computing device that allows the users 116a-116n to receive electronic messages and provides data associated with the users 116a-116n to the server(s) 104. For example, the client devices 112a-112n can include smartphones, tablets, desktop computers, laptop computers, or other electronic devices. The client devices 112a-112n can include one or more applications (e.g., electronic messaging application 114) that allows the users 116a-116n to receive and view electronic messages. For example, the electronic messaging application 114 can include a software application installed on the client devices 112a-112n. Additionally, or alternatively, the electronic messaging application 114 can include a software application hosted on the server(s) 104, which may be accessed by the client devices 112a-112n through another application, such as a web browser. Examples electronic messaging applications include email applications, instant messaging applications, native applications that can receive in-application notifications, etc.

Figure 2:
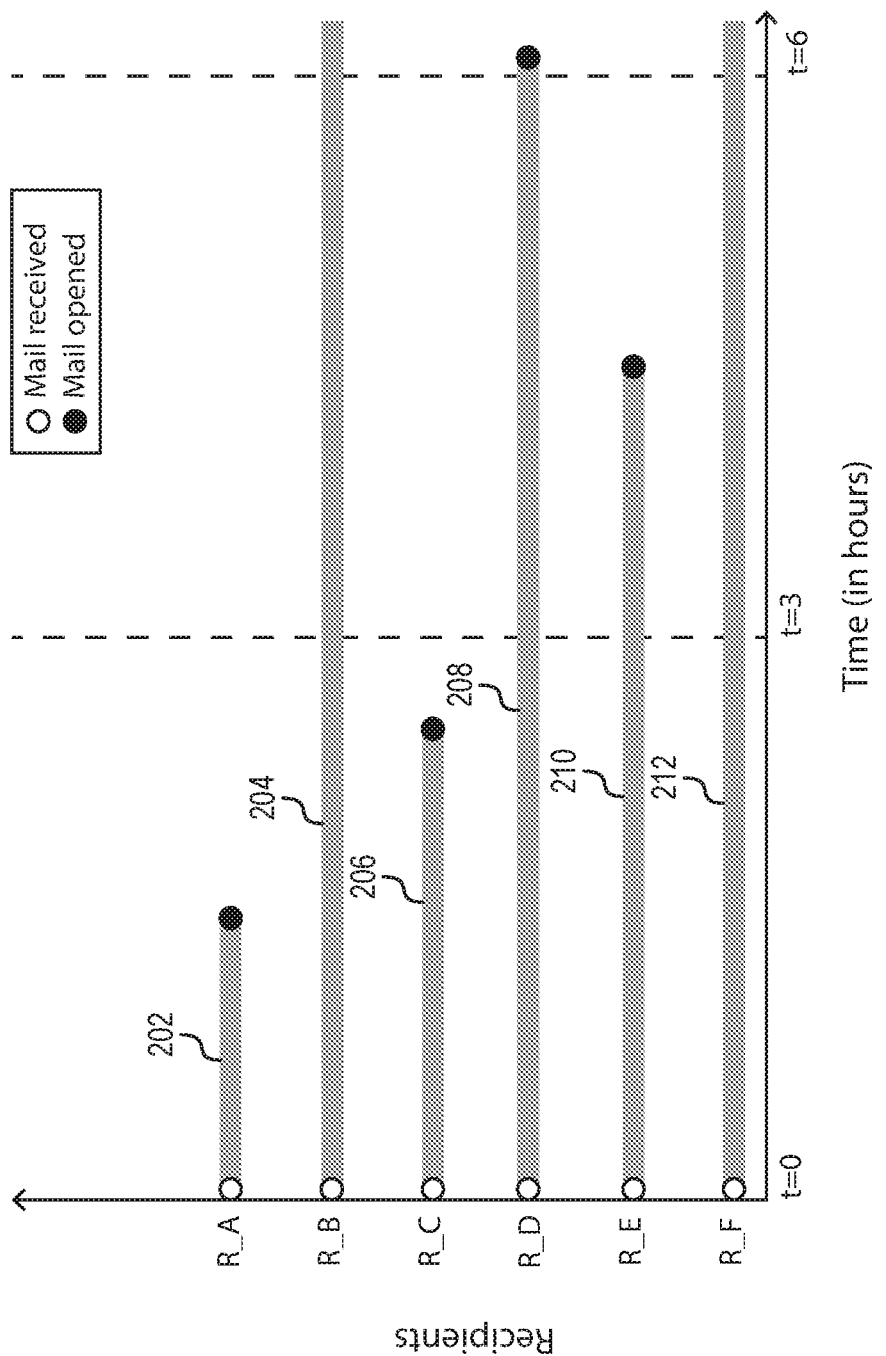
FIG. 2 illustrates an example graph of a set of survival data in accordance with one or more embodiments.

FIG. 2 provides an example graph of analytics data in accordance with one or more embodiments. More particularly, FIG. 2 depicts an exemplary observation of recipients receiving electronic messages in the context of survival analysis. Survival analysis is typically concerned with the time to an event. Survival analysis originated in the context of medical patients diagnosed with a terminal illness; therefore, the event of interest was historically death. However, the time-to-open modeling system 108 adapts survival analysis for the event of opening an electronic message by a recipient. As an example, FIG. 2 illustrates a set of recipients R_A 202, R_B 204, R_C 206, R_D 208, R_E 210, and R_F 212 who have received an electronic message at time t=0. In particular, FIG. 2 illustrates an observation that begins at t=0 and tracks the recipients' interaction with the electronic message (i.e., whether the recipients opened the message or not) for several hours of time.

One characteristic of data present in survival analysis, and illustrated by FIG. 2, is the presence of censoring, which refers to the fact that some observed individuals will experience the event of interest outside the observation window (hereinafter referred to as the "censoring window"). For example, in the context of electronic messages, censoring may occur because a recipient does not open the electronic message until after observation period has ended or because the recipient could no longer be tracked. Additionally, censoring may occur because the recipient is not prone to open the electronic message at all. Consequently, if a recipient opens an electronic message within the censoring window, that event is observed and the corresponding data is recorded. The corresponding data may include, but is not limited to, data describing that the recipient opened the electronic message and the time that elapsed before the recipient opened it. However, if the recipient does not open the electronic message within the censoring window, for whatever reason, the information is censored (i.e., the data is not available).

By way of example, FIG. 2 illustrates censoring and the effect that adjusting the censoring window may have on the amount of data available to record. The size of a censoring window may be limited for many reasons. For example, the window may be limited because the needs of the analysis demand such a limitation or because data simply becomes unavailable for the observed individuals after a certain period of time (e.g., the observed individual becomes untrackable).

Referring again to the graph depicted in FIG. 2, if an electronic message is received at time t=0 and the censoring window is set to three hours, the observer may observe that recipients R_A 202 and R_C 206 opened the message within that window. Recipients R_B 204, R_D 208, R_E 210, and R_F 212 are censored and no data is available from them. However, if the censoring window is expanded to span six hours after the electronic message is received, the observer will now observe that recipient R_E 210 also opened the message within the window. Recipients R_B 204, R_D 208, and R_F 212 will still be censored because they have not yet opened the electronic message. It is possible that, by extending the censoring window to span more time, recipients R_B 204, R_D 208, and R_F 212 will eventually open the electronic message (as can be seen with recipient R_D 208). However, it is possible that recipients R_B 204 and R_F 212 will never open the electronic message; therefore, the event for recipients R_B 204 and R_F 212 will never be observed regardless of the size of the censoring window. Thus, FIG. 2 illustrates that a larger censoring window may provide more observable events but does not guarantee that an event will be observed for every recipient.

As shown by FIG. 2, many recipients may not open an electronic message for hours or days or at all. In many cases, however, a sender of the electronic message may desire to analyze the outcome of a campaign in a short period of time. This is particularly the case when dealing with time sensitive electronic messages or electronic messages for which senders (e.g., marketers) desire or need to estimate a number of recipients that will respond within a relevant time window.

Survival analysis, in general, and the use of the conventional hazard models, which falls within the survival analysis framework, will now be discussed in greater detail. As mentioned above, survival analysis is generally concerned with the time to an event, which, in this context, is the opening of an electronic message. Generally speaking, survival analysis employs a survivor function to determine a survival probability, which is the probability that an individual will survive beyond a specified time t (i.e., not experience the event by time t). Where f(t) is the probability density function of t and F(t) is the corresponding cumulative distribution function, the general survivor function is as follows:

$$S(t)=P(T \geq t)=1-F(t)=\int_t^\infty f(u)du \quad (1)$$

There is a corresponding hazard function h(t) that represents, given the recipient has not opened the electronic message by time t, the instantaneous chance that the recipient will open the electronic message by time t+dt. The hazard function is expressed as follows:

$$h(t) = \lim_{dt \to 0} \frac{P(t \le T < t + dt \mid T \ge t)}{dt} \quad (2)$$

There is a relationship between the hazard function and the survivor function that may be derived from the above definitions of each. The relationship is derived as follows:

$$h(t) = \lim_{dt \to 0} \frac{P(t \le T < t + dt \mid T \ge t)}{dt} \quad (3)$$

$$h(t) = \lim_{dt \to 0} \frac{F(t+dt) - F(t)}{dt} \frac{1}{S(t)}$$

$$h(t) = \frac{f(t)}{S(t)} = -\frac{d}{dt}\{\log S(t)\} \text{ OR } S(t) = \exp\{-H(t)\}$$

In the equation above, $H(t)$ is the cumulative hazard function corresponding to $h(t)$.

A data set containing N recipients is represented with $\{X_i, Y_i, \delta_i\}$, where $i = 1 \ldots N$. $X_i$ is a vector of features determined to affect the time that will elapse before the recipient i opens an electronic message. $X_i$ can include any feature that is believed to have an impact on the time it takes for recipient i to open the message. Such features can include, but are not limited to, the send time of the electronic message, the date on which recipient i subscribed to receive electronic messages from the sender of the message, the number of electronic messages recipient i has received, the number of electronic messages recipient i has opened, the number of links in past electronic messages that recipient i has clicked, and the past open rate of recipient i. Additionally, $Y_i = \min(t_i, C_i)$ and represents the survival time associated with the recipient i. $C_i$ represents the censoring window. Consequently, if the recipient i opened the electronic message during observation, then $t_i < C_i$. The indicator variable $\delta_i$ represents whether or not the recipient i opened the electronic message within the censoring window.

$$\delta_i = \begin{cases} 1, & \text{if } t_i < C_i \\ 0, & \text{otherwise} \end{cases} \quad (4)$$

In one or more embodiments, the time-to-open modeling system 108 uses Cox Proportional Hazard (hereinafter referred to as "CoxPH") modeling to incorporate, into the estimation of the recipient's hazard, the recipient's set of features that affect the time within which the recipient will open an electronic message. In particular, the hazard function for recipient i at time t can be defined using CoxPH modeling in the following way:

$$h_i(t \mid X_i) = h_0(t)\psi(X_i) \quad (5)$$

Here, $h_0(t)$ is the baseline hazard function at time t, and $\psi(\cdot)$ incorporates the dependence on the recipient-specific features $X_i$. The time-to-open modeling system 108 uses a semi-parametric approach, in that the time-to-open modeling system does not incorporate any assumptions about the shape of the baseline hazard function. Based on the relationship between the hazard function and the survivor function described above, the CoxPH model defines the survivor function as follows:

$$S_i(t \mid X_i) = \exp\{-\int_0^t h_0(u)\psi(X_i)du\}$$

$$S_i(t \mid X_i) = [\exp\{-H_0(t)\}]^{\psi(X_i)}$$

$$S_i(t \mid X_i) = S_0(t)^{\psi(X_i)} \quad (6)$$

Taking $\psi(X_i) = \exp(\beta^T X_i)$ the Cox PH modeling survivor function may be expressed as $$S_i(t \mid X_i) = S_0(t)^{\exp(\beta^T X_i)} \quad (7)$$

The survivor function just described has a corresponding likelihood function defined as:

$$L(\beta) = \prod_{i:\delta_i=1} \frac{\psi(X_i; \beta)}{\sum_{l \in R(t_i)} \psi(X_l; \beta)} \quad (8)$$

In the likelihood function shown above, $R(t_i)$ is the set of recipients who have not yet opened the electronic message by time $t_i$. Thus, the likelihood of the data is a product of information at each time point where the event has occurred and censored individuals do not contribute to the numerator. Additionally, $\beta$ is a vector of parameters that affects the dependence of the time in which a recipient will open an electronic message on the features $X_i$. The time-to-open modeling system 108 estimates the values of $\beta$ by maximizing the above likelihood using a gradient based method.

Figure 3:
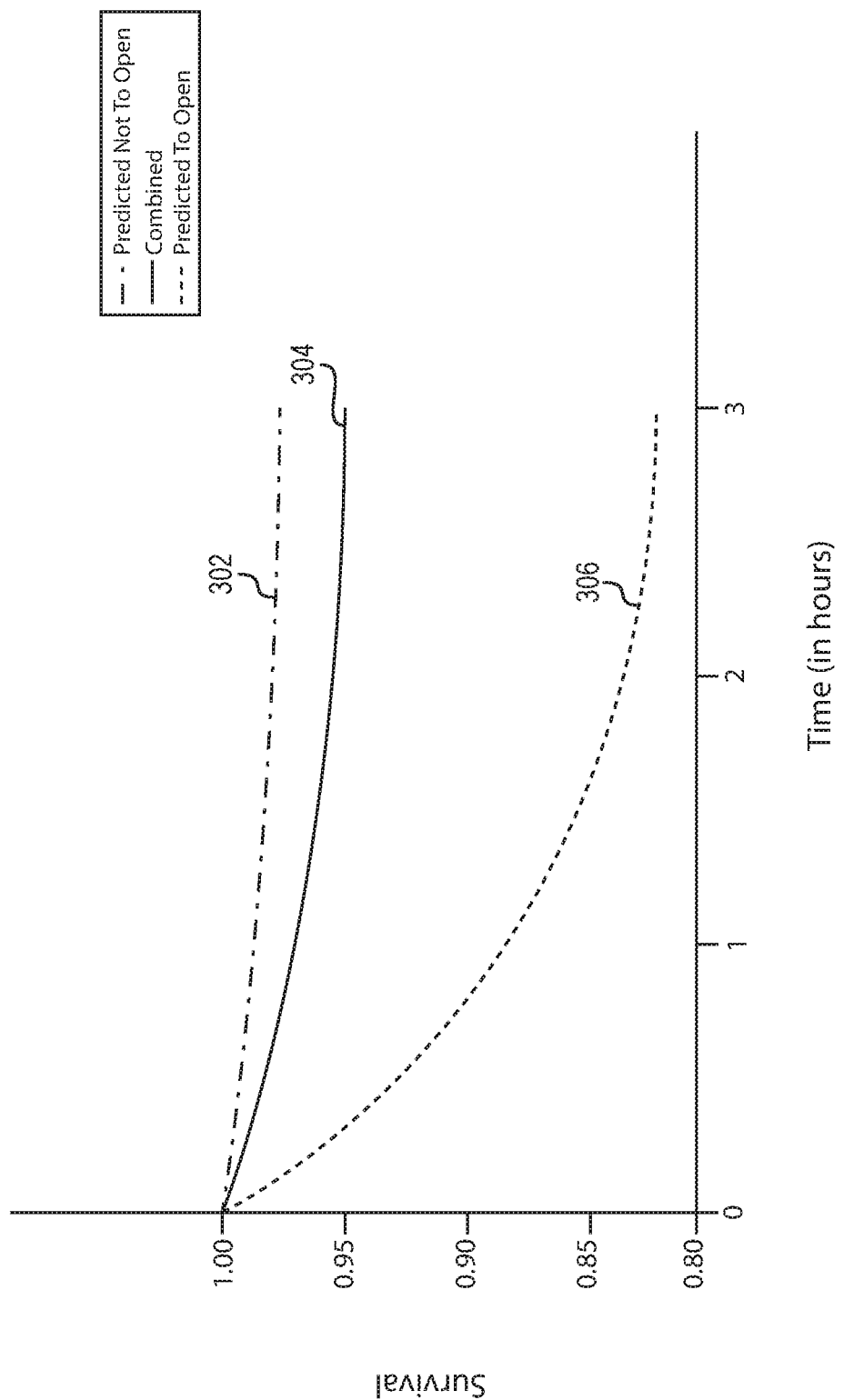
FIG. 3 illustrates a graph plotting the survival of an example set of recipients of an electronic message in accordance with one or more embodiments.

Turning now to FIG. 3, the use and benefits of implementing a mixture model into the survival analysis will be discussed. FIG. 3 illustrates the survival of a test group of recipients as observed over a censoring window of three hours. The solid line 304 plots the survival of the test group as determined by the survivor function under the CoxPH model described above. As shown in FIG. 3, the solid line 304 flattens to a survival value of around 0.95 at three hours, representing that around 95% of recipients of the test group did not open the electronic message within the three-hour censoring window. In other words, only 5% of recipients opened the message and provided recordable data within that time period.

The solid line 304 is labeled "Combined" as it includes both recipients who were predicted to eventually open the electronic message and recipients who were predicted to never open the electronic message. Because of survival analysis's origins in the medical field, the CoxPH model assumes that all individuals will eventually experience the event of interest. However, this is not the case in the context of electronic messaging when the event of interest is the opening of the message. Many recipients of an electronic message will delete or otherwise neglect to open the message altogether. When incorporated as part of the survival analysis, the recipients who are not prone to opening the electronic message impact the resulting survival of the group. As will be explained in more detail below, if the time-to-open modeling system 108 combines those recipients who are prone to opening an electronic message and those who are not in estimating when recipients will open the electronic message, the sender of the electronic message risks using a recipient list comprising those who will never open the message. Consequently, it is beneficial for the time-to-open modeling system 108 to distinguish between those recipients prone to opening the electronic message and those who are not.

By applying a mixture model modification to the survivor function derived under the CoxPH model, the survival analysis of the time-to-open modeling system 108 can account for the proportion of recipients who are not prone to opening the electronic message. Under a mixture model modification, the $i^{th}$ recipient is represented by $\{X_i, Y_i, \delta_i, L_i, Z_i\}$ where $X_i$, $Y_i$, and $\delta_i$ are the same as above. $Z_i$ is a set of features that affects the probability that recipient i will open the electronic message. $Z_i$ can include any feature that is believed to have an impact on the probability that recipient i will open the electronic message. Such features can include, but are not limited to, recipient i's age, interests, geographic location, and occupation. In one or more embodiments, $Z_i$ and $X_i$ include all of the same features. In alternative embodiments, $Z_i$ and $X_i$ may share at least a subset of common features. Further, $L_i$ is a latent indicator variable that represents whether or not recipient i is prone to opening the electronic message.

$$L_i = \begin{cases} 1, & \text{prone to the event} \\ 0, & \text{otherwise} \end{cases} \quad (9)$$

In one or more embodiments, recipient i is prone to opening the electronic message if the chance that recipient i will open the message is above 50%. Alternative embodiments, however, may require a higher or lesser chance to categorize recipient i as prone to opening an electronic message. To determine the probability that recipient i will open the electronic message, given the feature set $Z_i$, the time-to-open modeling system 108 uses the following equation:

$$\pi(Z_i) = P(L_i = 1 \mid Z_i) = \frac{\exp(b^T Z_i)}{1 + \exp(b^T Z_i)} \quad (10)$$

In the equation above, b is a vector of parameters that affect the impact of the set of features $Z_i$ on the probability that recipient i opens the electronic message. The probability is estimated using logistic regression and introduced as a mixture probability into the survivor function. Additionally, the complement to the mixture probability (i.e., the probability that recipient i does not open the message) is also introduced into the survivor function. Thus, the mixture modeling allows the survival analysis to account for recipients not prone to opening the electronic message. The resulting survivor function is as follows:

$$S_i(t|X_i) = \pi(Z_i) S(t_i | L=1, X_i) + (1-\pi(Z_i)) \quad (11)$$

Overall, the probability of whether the recipient opens the message or not is incorporated into the resulting survival probability. Specifically, the probability that the recipient opens the message is included in the first term of the equation and the complementary probability that the recipient does not open the message is included in the second term of the equation. Therefore, a recipient who is not prone to open a message will have a high survival probability across time for that message. Conversely, a recipient who is expected to open the message will have a comparatively lower survival probability. For example, if recipient i has a very low probability of opening the electronic message, then $\pi(Z_i) \approx 0$ and the resulting survival probability will be close to 1. Conversely, if recipient i is very likely to open the electronic message, then $\pi(Z) \approx 1$, the first term in the equation above will dominate and the survival probability resembles that determined under the CoxPH modeling survivor function equation. To estimate $L_i$ along with the parameters β and b, the time-to-open modeling system 108 maximizes the following likelihood function:

$$L(\beta,b) = \Pi_{i=1}^{N} [1-\pi_i(Z_i)]^{1-L_i} [\pi_i(Z_i) S(t_i | L=1, X_i) \{h(t_i | L_i, X_i)\}^{\delta_i}]^{L_i} \quad (12)$$

Thus, the time-to-open modeling system 108 jointly models both the open event as well as the time-to-open.

Once $L_i$ and the parameters β and b are estimated or learned, the mixture model modified survivor function is trained. In other words, the time-to-open modeling system 108 can use the mixture model modified survivor function (having the learned parameters) to score potential recipients and determine their likelihood of opening an electronic message at all and their time to open.

As shown in FIG. 3, by introducing the mixture probability into the survivor function, the time-to-open modeling system 108 can distinguish between recipients who are prone to opening electronic messages and those who are not. The dash-dot line 302 represents those recipients from the test group who were not expected to open the electronic message and the dashed line 306 represents those recipients who were expected to open the electronic message. Recipients represented by the dash-dot line 302 and the dashed line 306 are both subgroups of the overall combined test group represented by the solid line 304 and become separable by introducing the mixture probability into the CoxPH survivor function so that the survival of each subgroup may be plotted separately. While the solid line 304 representing the combined group shows that 95% of all recipients of the test group did not open the electronic message within the three-hour censoring window, the dashed line 306 shows that only approximately 80% of recipients who were expected to eventually open the electronic message failed to do so within the censoring window. The dash-dot line 302 shows that very few recipients who were not expected to ever open the electronic message did so within the censoring window, accounting for the higher unopened rate when comparing the solid line 304 to the dashed line 306. In other words, when considering only those recipients who are expected (i.e., prone) to open the electronic message, one would observe a significantly higher number of events within the three-hour censoring window than when considering all recipients combined.

From the perspective of one planning to send an electronic message, the time-to-open modeling system 108 provides a great benefit in using mixture model modification. For example, a potential recipient may possess a set of features indicating that the particular potential recipient typically opens electronic messages very quickly after the message is received. However, the potential recipient may also possess a set of features that indicate that the potential recipient is not likely to open that particular electronic message at all. Therefore, if only looking at those features indicating the time-to-open, the sender of the message may send the electronic message to that potential recipient, erroneously believing that the potential recipient will open that particular message within the desired censoring window. However, when accounting for the set of features that indicate that the potential recipient is unlikely to open that particular electronic message, the sender of the message may exclude the potential recipient from the recipient list, leaving room on the list for recipients who are more likely to view the message.

The addition of the mixture probability becomes particularly relevant where the electronic message is time-sensitive. For example, the sender may be a marketer and the electronic message may contain an advertisement email for a flash sale of items limited in quantity. In such a scenario, the marketer would aim to send the advertisement to an exclusive list of recipients to avoid generating demand for the sale items in excess of the supply. Additionally, the marketer would wish to optimize the recipient list to generate as much interest as possible within that exclusive group of recipients. The marketer could estimate a time-to-open for each potential recipient to ensure that the recipient only includes recipients most likely to read emails soon after they are received; however, the marketer may fail to generate the desired interest if those recipients also would not be prone to opening that particular email at all. Due to the time-sensitive nature of the advertisement, it is greatly beneficial for the marketer to be able to optimize the recipient list at the outset to include only those who are expected to read the email and read it within the desired time frame.

More detail regarding how the time-to-open modeling system 108 operates using the mixture model survival analysis to estimate a time-to-open for potential recipients is now described. In one or more embodiments, the time-to-open modeling system 108 trains a survivor function to predict a time-to-open for a potential recipient of an electronic communication. For example, in one or more embodiments, the time-to-open modeling system 108 accesses, from an analytics database (such as analytics data base 110), analytics training data associated with past recipients of electronic messages. The time-to-open modeling system 108 parses the analytics training data and extracts a first set of features that affected the time that elapsed before the past recipients opened the message. This first set of features corresponds to the feature vector $X_i$ described above. In one or more embodiments, the time-to-open modeling system also extracts a second set of features that affected whether the past recipients would open the electronic message at all. The second set of features corresponds to the feature vector $Z_i$ described above.

In one or more embodiments, the time-to-open modeling system 108 then performs a step for training a survivor function to model a time-to-open on a continuous scale for a potential recipient by taking the following steps. In particular, the time-to-open modeling system 108 derives the survivor function under the CoxPH model. The time-to-open modeling system 108 introduces a mixture probability into the survivor function. The time-to-open modeling system 108 can also use outcome data that indicates whether or not the past recipients opened the electronic message and the time that elapsed before the recipients opened the message. The time-to-open modeling system 108 can then estimate the parameters β and b affecting their respective sets of features by maximizing the likelihood of the data, using the likelihood function shown above as equation 12.

Through this process, the time-to-open modeling system 108 trains the survivor function to estimate the time-to-open for a potential recipient of an electronic message. Further, the time-to-open modeling system 108 trains the survivor function to distinguish between those potential recipients who are prone to open a particular electronic message and those potential recipients who are not. By applying the survivor function to a set of potential future recipients, the time-to-open modeling system 108 allows the sender to focus on recipients that will view the message within a given time frame, providing the benefit of optimizing a recipient list for electronic messages. Once the time-to-open modeling system 108 learns or estimates the parameters β and b, the time-to-open modeling system 108 can use the trained model to estimate a time-to-open for one or more potential recipients.

To estimate a time-to-open for a potential recipient, the time-to-open modeling system 108 accesses analytics data associated with the potential recipient. From the analytics data, the time-to-open modeling system 108 extracts a first set of features that affects the time within which the potential recipient will open an electronic message. More particularly from the perspective of the sender of the message, this first set of features affects whether the potential recipient will open the electronic message within a given time period. The first set of features corresponds to the set of features X described above. Additionally, the time-to-open modeling system estimates a hazard function for the potential recipient. Under the CoxPH model, the hazard function is the product of a baseline hazard and a relative hazard of the potential recipient. The baseline hazard is a global quantity that incorporates the dependence on time. The relative hazard of an individual incorporates the potential recipient's set of features $X_i$. Because there is a relationship between the survivor function and the hazard function, the time-to-open modeling system 108 can incorporate the potential recipient's set of features $X_i$ into the survivor function under CoxPH modeling. Therefore, the time-to-open modeling system 108 includes the effect of these features when solving for the potential recipient's survival probability at a given time t.

In one or more embodiments, the time-to-open modeling system 108 also extracts a second set of features that affects whether or not the potential recipient will open the electronic message altogether. The second set of features corresponds to the set of features $Z_i$ described above and is incorporated into the survivor function as part of the mixture probability. By incorporating the mixture probability into the survivor function, the time-to-open modeling system 108 can distinguish between those potential recipients who are prone to opening the electronic message and those who are not prone to do so. As discussed previously, the probability that a potential recipient will open an electronic message affects the resulting survival probability. Therefore, those who are not prone to opening the electronic message will have a higher survivor probability for every value of time. Conversely, the more likely the potential recipient is to open the electronic message, the higher will be the value of $\pi(Z_i)$, leading to a lower survival probability for each value of time t.

In one or more embodiments, the addition of the mixture probability into the survivor function, as just mentioned, is enough for the time-to-open modeling system 108 to distinguish between those potential recipients who are not likely to open and those who are. In other words, because the mixture probability affects the resulting survival probability, potential recipients who are unlikely to open the message at all, will have a higher survival probability for each value of time compared to those who are prone to opening the message. In one or more alternative embodiments, the time-to-open modeling system 108 may entirely ignore those potential recipients with a low probability of opening the electronic message. In such a case, the time-to-open modeling system 108 may determine whether the probability that the potential recipient will open the electronic message meets a specific threshold probability. The threshold probability may be set as a predetermined default probability or may be selected as a preference by the sender of the message. The threshold probability could be set to be any probability that is determined to be useful for the purposes of sending the message. For example, the sender of the message may choose a threshold probability of 50%. In such a scenario, the time-to-open modeling system 108, may determine whether the potential recipient meets this threshold probability before solving the survivor function for the potential recipient. If the potential recipient does not meet the threshold probability, the time-to-open modeling system may forego solving the survivor function for the potential recipient and return a null result to the sender. Alternatively, the time-to-open modeling system 108 may solve the survivor function of the potential recipient and then list the potential recipient under a category of potential recipients estimated unlikely to open the electronic message.

In one or more embodiments, and as illustrated in FIG. 4A, the time-to-open modeling system 108 subsequently constructs a survival curve for the potential recipient based on the results of the survivor function. As can be seen in FIG. 4A, the survival curve provides the survival probability of the potential recipient for any value of time t on a continuous scale of time. The continuous time scale, compared to a discrete scale, provides more accuracy and precision in estimating whether a potential recipient will open an electronic message within a specified time frame. Consequently, the sender of the message will be able to generate a recipient list that has been optimized more fully for its purpose.

As illustrated in FIG. 4A, the time-to-open modeling system 108 generates the survival curve 400 on an individual basis. Consequently, the survival curve 400 plots the survival probability (i.e., the probability that the potential recipient will not have opened the electronic message by the specified time) for every value of time. Therefore, the time-to-open modeling system 108 uses the survival curve 400 to generate an estimated time that the potential recipient will open an electronic message. FIG. 4A illustrates exemplary points of interest on the survival curve 400. In particular, FIG. 4A highlights points 402, 404 on the survival curve 400 that correspond to t(5) and t(50) respectively, which will be explained in more detail. It should be noted that the survival curve of FIG. 4A is atypical for electronic messages in that it flattens after the 50% percentile.

In one or more embodiments, the time-to-open modeling system 108 generates the estimated time by selecting a desired open percentile (representing the probability that the potential recipient will have opened the electronic message by the associated time) and locating the corresponding time on the survival curve 400. The chosen open percentile may be a setting determined by the time-to-open modeling system 108 or it may be a setting selected by the sender of the electronic message. In general, the predicted time to open of a message by the $i^{th}$ recipient, is the largest $t_i$ for which the following is true:

$$S_i\{t_i(p)\} > 1 - \frac{p}{100} \quad (13)$$

For example, the sender of an electronic message may desire to know at what time there is a 50% chance that the potential recipient will open the electronic message by that time. In other words, the sender desires to know at what time the survival curve 400 corresponds to t(50). Using the equation above, the corresponding survival probability is 0.5. Therefore, to find the desired time, the time-to-open modeling system 108 locates the point 404 on the survival curve 400, indicating that there is a survival probability of 0.5 within the one hour mark.

Similarly, if the sender of the electronic message only desires to know when a potential recipient will have a 5% chance of opening the electronic message, the time-to-open modeling system may locate the point 402 on the survival curve 400 that corresponds to t(5). Using the equation above, this is the point on the survival curve 400 where the potential recipient has a survival probability of 0.95. The survival curve 400 of FIG. 4A shows that the potential recipient has an estimated survival probability of 0.95 shortly after the electronic message would be sent.

Using this approach on a large set of potential recipients, the time-to-open modeling system 108 can show a sender of an electronic message the estimated times at which each potential recipient will satisfy the desired open percentile. The time-to-open modeling system 108 may then generate a recipient list including only those potential recipients with the lowest corresponding times. For example, the time-to-open modeling system 108 may list the potential recipients in increasing order of their corresponding time-to-open values and remove a percentage of the potential recipients who have the largest time-to-open values. The time-to-open modeling system 108 may subsequently send the electronic message to those remaining on the list.

In one or more alternative embodiments, the time-to-open modeling system 108 generates the estimated time that a potential recipient will open an electronic message by selecting a desired time within which the electronic message will be opened and locating the corresponding survival probability on the survival curve 400. For example, if the sender of the electronic message desires that the message be opened within three hours, the time-to-open modeling system 108 will locate, on the survival curve 400, the lowest survival probability within that time frame. In one or more embodiments, the survival curve is cumulative in which case the lowest survival probability will be found at the end of the time frame (indicating the probability that the message won't be opened throughout the entire time frame).

Using this approach for a large set of potential recipients, the time-to-open modeling system 108 may generate a recipient list including only those potential recipients with the lowest survival probabilities in the given time frame. The time frame may be determined by the time-to-open modeling system 108 or it may be selected by the sender of the electronic message. This approach is especially useful in situations, such as a marketer advertising a flash sale, where the message is time sensitive and the sender desires to limit the size of the recipient list. In such a situation, the sender may select the time frame within which the electronic message needs to be sent based on the needs of the sale. The sender may provide the list of potential recipients, the desired time frame, and the size limit of the resulting recipient list to the time-to-open modeling system 108. The time-to-open modeling system 108 may then generate a recipient list that satisfies the size limit based on which potential recipients had the lowest survival probabilities within the provided time frames.

Figure 4B:
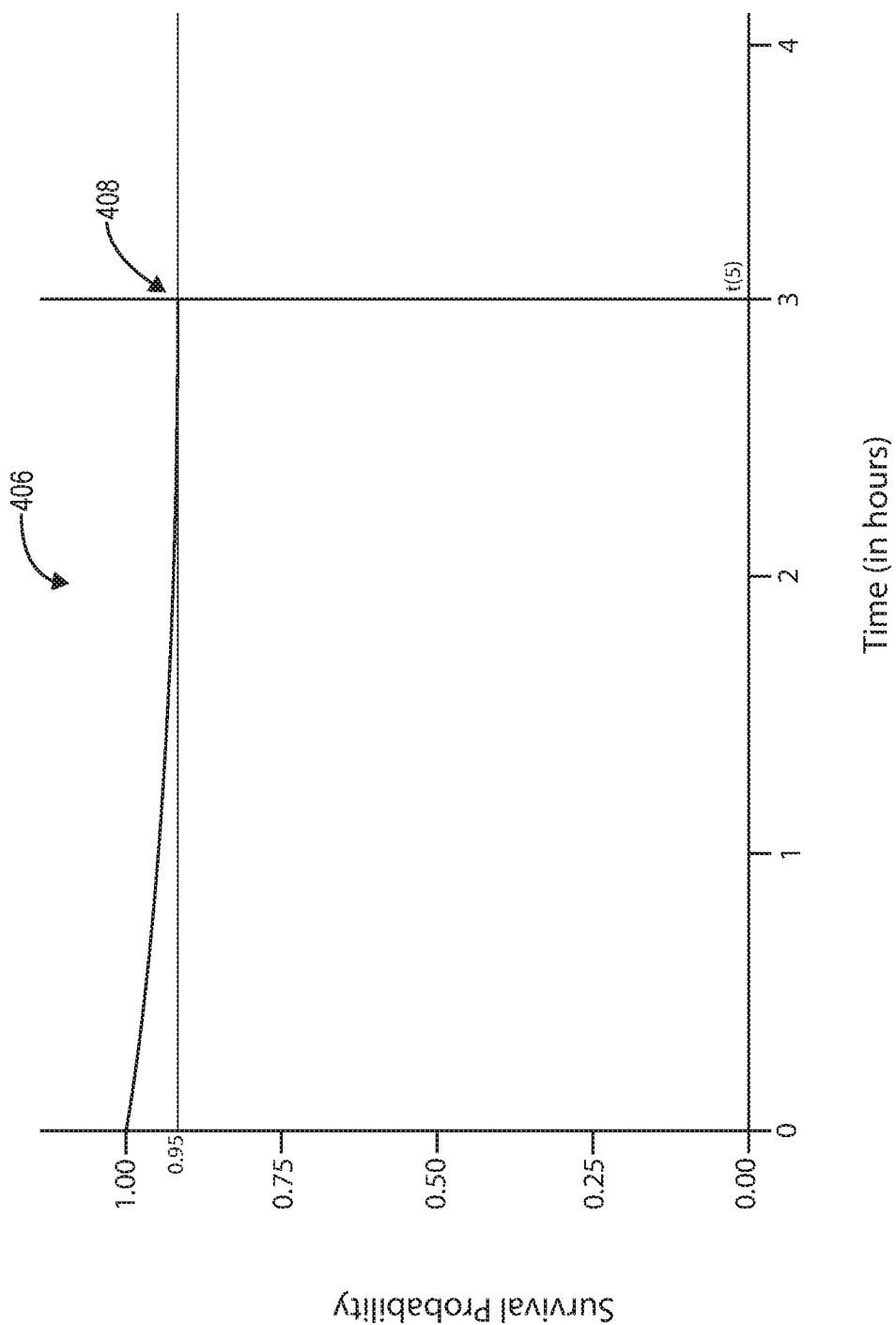

FIG. 4B illustrates a graph of a survival curve 406 for another exemplary potential recipient. In particular, FIG. 4B highlights a potential recipient who may have a very high survival probability within a given time frame. This high survival probability may result from censoring where the potential recipient's survival curve is only observed for a limited period of time. In such a case, the time-to-open modeling system 108 may have placed an upper limit (e.g., four hours) on the values of time for which it solved the survivor function; therefore, the potential recipient's survival probability beyond the upper limit is unknown. Alternatively, the survival curve 406 may be due to the potential recipient's low probability of ever opening the electronic message. The survival curve of FIG. 4B is consistent with a recipient of an electronic marketing message in that it flattens well before reaching 50%.

As explained above, if the potential recipient has a low probability of ever opening the electronic message, that probability leads to a higher resulting survival probability when introduced as a mixture probability into the overall survivor function. Therefore, the survival curve 406 may represent a potential recipient who is unlikely to ever open the electronic message.

As illustrated by FIG. 4B, the survival curve 406 never reaches a survival probability below 0.95. Therefore, if the time-to-open modeling system 108 generates an estimated time-to-open by determining the desired open percentile and locating the corresponding time on the survival curve 406, the time-to-open modeling system would be limited to lower percentiles than those available for the survival curve 400 of FIG. 4A. By way of example, the time-to-open modeling system may find a point 408 that corresponds to t(5) or the time at which there is a 5% chance that the potential recipient will have opened the electronic message by that time.

One will appreciate in light of the disclosure herein, that the time-to-open modeling system 108 can provide a marketer various insights that allow for improved marketing campaigns. For example, in one or more embodiments, the time-to-open modeling system 108 can automatically create segments of users for a targeting as part of a marketing campaign. For a given set of potential recipients, the time-to-open modeling system 108 computes a time to open as described above. Then the time-to-open modeling system 108 segments the potential recipients into a marketer-defined number of segments based on quantiles of time to open values. For example, if the number of segment is 4, the time-to-open modeling system 108 can divide the potential recipients into a first segment of recipients with time to open percentile values of 0 to 25%, a second segment of recipients with time to open percentile values of 26 to 50%, a third segment of recipients with time to open percentile values of 51 to 75%, and a fourth segment of recipients with time to open percentile values of 76 to 100%.

In another embodiment, the time-to-open modeling system 108 determine a quality of a segment of targeted users. For example, for a segment of recipients, the time-to-open modeling system 108 determines time to open values as described above. The time-to-open modeling system 108 can then determine aggregate statistics like mean or median time to open values to assess the quality of recipients in the target segment. For recipients with high time to open values, the time-to-open modeling system 108 can remove them from the targeted segment or use a different campaign in an attempt to re-active or otherwise engage the recipients with high time to open values.

In yet another embodiment, the time-to-open modeling system 108 generates a scheduling order for recipients in a segment. For example, for a segment of recipients, the time-to-open modeling system 108 determines time to open values as described above. The time-to-open modeling system 108 then sends (or schedules) electronic messages to be sent to recipients arranged in increasing order of their time to open values. In one or more embodiments, the time-to-open modeling system 108 first removes a bottom percent or number of recipients from the segment (i.e., removes recipients with high time to open values). In other words, the time-to-open modeling system 108 removes recipients with a low likelihood of opening the electronic message. Additionally, the time-to-open modeling system 108 can send electronic messages to a top percent or number of recipients from the segment through reputed IPs to ensure high deliverability. By so doing, the time-to-open modeling system 108 can help increase future deliverability of the IPs as the response rates will be high for the top recipients in the segment.

Figure 5:
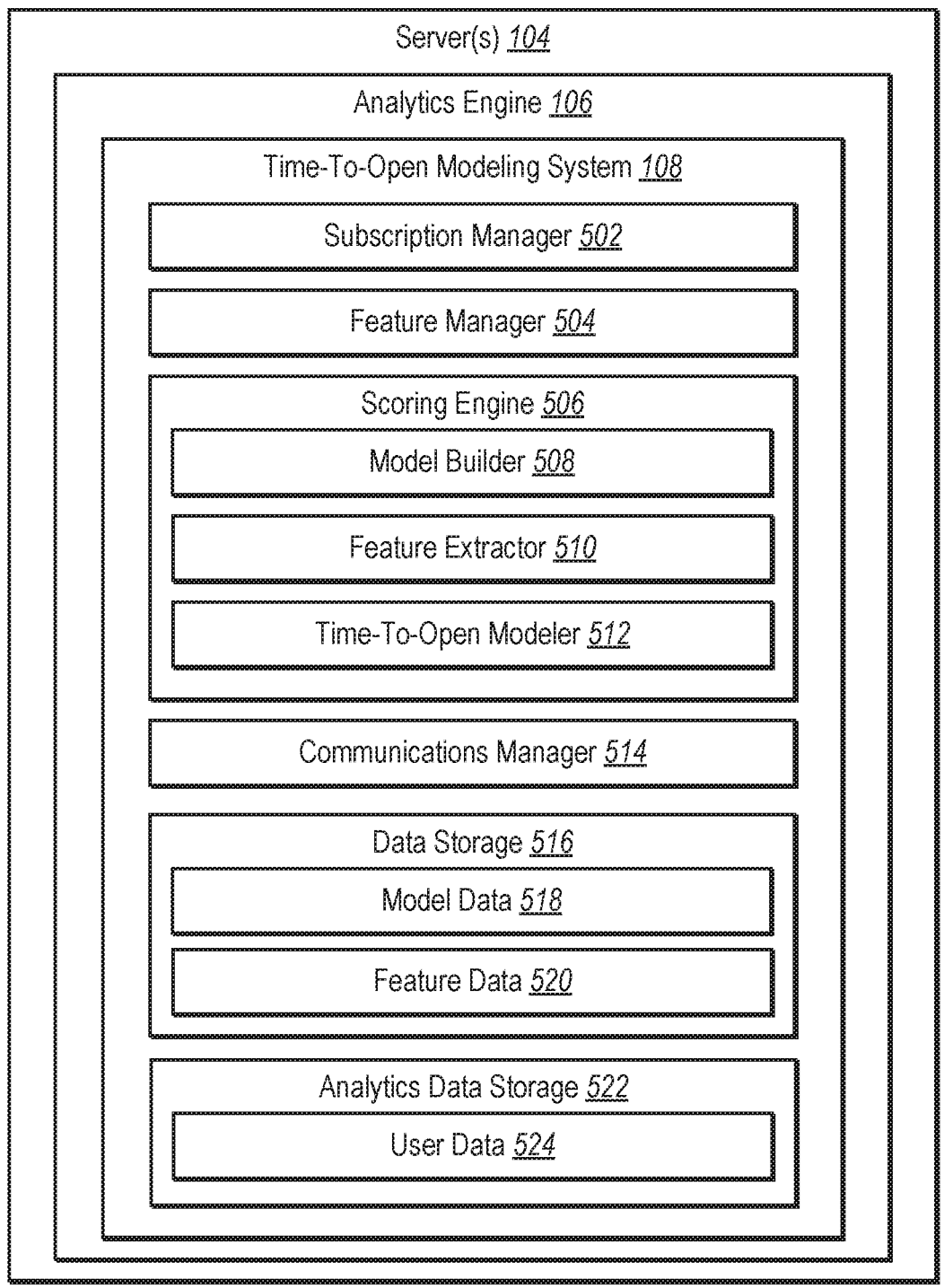
FIG. 5 illustrates an example schematic diagram of a time-to-open modeling system in accordance with one or more embodiments.

FIG. 5 illustrates a detailed schematic diagram of an example architecture of the time-to-open modeling system 108 of FIG. 1. As shown, the time-to-open modeling system can be part of server(s) 104 and analytics engine 106. Additionally, the time-to-open modeling system 108 can include, but is not limited to, a subscription manager 502, a feature manager 504, a scoring engine 506, a communications manager 514, data storage 516 and analytics data storage 522.

In one or more embodiments, each of the components of the time-to-open modeling system 108 are in communication with one another using any suitable communication technologies. Additionally, the components of the time-to-open modeling system 108 can be in communication with one or more other devices including a client device of a user. It will be recognized that although the components of the time-to-open modeling system 108 are shown to be separate in FIG. 5, any of the subcomponents may be combined into fewer components, such as into a single component, or divided into more components as may serve a particular implementation. Furthermore, although the components of FIG. 5 are described in connection with the time-to-open modeling system 108, at least some components for performing operations in conjunction with the time-to-open modeling system 108 described herein may be implemented on other devices within the environment.

The components of the time-to-open modeling system 108 can include software, hardware, or both. For example, the components of the time-to-open modeling system 108 can include one or more instructions stored on a computer readable storage medium and executable by processors of one or more computing devices or, alternatively, by servers (e.g., server(s) 104) of a system. When executed by the one or more processors or servers, the computer-executable instructions of the time-to-open modeling system 108 can cause the computing device or system to perform the training and estimation functions described herein. Alternatively, the components of the time-to-open modeling system 108 can comprise hardware, such as a special purpose processing device to perform a certain function or group of functions. Additionally, or alternatively, the components of the time-to-open modeling system 108 can include a combination of computer-executable instructions and hardware.

Furthermore, the components of the time-to-open modeling system 108 performing the functions described herein with respect to the time-to-open modeling system 108 may, for example, be implemented as part of a stand-alone application, as a module of an application, as a plug-in for applications including electronic messaging applications, as a library function or functions that may be called by other applications, and/or as a cloud-computing model. Thus, the components of the time-to-open modeling system 108 may be implemented as part of a stand-alone application on a personal computing device or a mobile device. Alternatively, or additionally, the components of the time-to-open modeling system 108 may be implemented in any application that allows creation and delivery of electronic messages to recipients.

As mentioned, the time-to-open modeling system 108 can include the subscription manager 502 to facilitate management of information of recipients and potential recipients who have subscribed to receive electronic messages from a sender. In one or more embodiments, the subscription manager 502 may manage information from those who have not subscribed as well. In particular, subscription manager 502 can gather subscriber information upon a user registering (e.g., subscribing) to receive electronic messages from a sender. For example, the subscription manager 502 may gather information from a user filling out a profile for the electronic messaging application 114 of FIG. 1. Additionally, or alternatively, the subscription manager 502 can gather subscriber information over time as it tracks and observes subscriber interactions with electronic messages. For example, the subscription manager 502 can collect and manage subscriber information, including a history of messages received, an open rate of the subscriber, and any other information associated with the subscribing recipients and potential recipients. In one or more embodiments, the subscription manager 502 can store the information in the analytics database 110 of FIG. 1 for later access by one or more components of the time-to-open modeling system 108.

As mentioned above, the time-to-open modeling system 108 can further include a feature manager 504 that facilitates management of features associated with recipients and potential recipients. For example, the feature manager 504 may determine associations between a feature and a feature set depending on how the particular feature affects a given recipient's interaction with an electronic message. For example, if the feature manager 504 determines that a particular feature affects whether or not a given recipient will open an electronic message, the feature manager 504 may associate that information with the feature vector $Z_i$. In one or more embodiments, the feature manager stores the determined association in the feature data 520. In alternative embodiments, the feature manager 504 may communicate this association to the analytics database 110 which may store the data according to the association.

Additionally, the time-to-open modeling system 108 may include a scoring engine 506 to facilitate the training and application of a survivor function. In particular, the scoring engine 506 includes a model builder 508, a feature extractor 510, and a time-to-open modeler 512. In particular, the model builder 508 trains a survivor function to estimate a time-to-open for a potential recipient of an electronic message. This includes deriving the survivor function under the CoxPH model. Additionally, or alternatively, the model builder 508 introduces a mixture probability into the survivor function to account for the portion of recipients that have a low probability of opening the electronic message. The model builder 508 uses a first set and second set of features associated with past recipients of electronic messages to train the survivor function. The first set of features affected whether or not the past recipients opened the electronic message within a specified time. The second set of features affected whether or not the past recipients opened the electronic message at all. In one or more embodiments, the model builder also uses outcome data describing whether each past recipient opened the message and, if so, within what time frame. In training the survivor function, the model builder estimates the parameters that control their respective feature sets and may store the estimated parameters in the feature data 520.

As mentioned, the scoring engine 506 also includes a feature extractor 510. When training the survivor function to estimate a time-to-open for potential recipients, the time-to-open modeling system 108 uses features associated with past recipients that affected whether the past recipients opened the electronic message and, if so, the time within which they did so. The feature extractor 510 accesses analytics training data from the analytics database 110 and extracts these features. Additionally, when the time-to-open modeling system 108 estimates a time-to-open for a potential recipient, the feature extractor 510 accesses analytics data from the analytics database 110 and extracts features associated with the potential recipient that will affect whether or not the potential recipient opens the electronic message and, if so, the time within which the potential recipient will do so. Whether extracting features associated with past recipients or potential recipients, the feature extractor 510 uses the associations between features and feature sets determined by the feature manager 504. After extracting these features, the feature extractor 510 may store the data in the user data 524 storage.

As previously mentioned, the scoring engine 506 also includes a time-to-open modeler 512 to facilitate estimating the time-to-open for potential recipients. In particular, the time-to-open modeler 512 uses the features associated with the potential recipient and extracted by the feature extractor 512, as well as the survivor function trained by the model builder 508, to estimate a time-to-open for the potential recipient. For example, the time-to-open modeler 512 uses the first set of features and second set of features extracted from the analytics database by the feature extractor 510. Additionally, the time-to-open modeler 512 uses the estimated parameters determined by the model builder 508. The time-to-open modeler 512 applies these feature sets and estimated parameters to the mixture model modified survivor function. Additionally, the time-to-open modeler 512 estimates the probability that the potential recipient will open the electronic message at all. In solving the mixture model modified survivor function, the time-to-open modeler 512 constructs the survival curve of the potential recipient, which plots the survival probability of the potential recipient over a continuous time scale. Based on the constructed survival curve, the time-to-open modeler 512 may generate an estimated time within which the potential recipient will open the electronic message.

As mentioned above, the time-to-open modeling system 108 includes a communication manager 514 to facilitate sending electronic messages to with recipients. Additionally, the time-to-open modeling system includes data storage 516 which stores model data 518 and feature data 520. Model data 518 may include the mixture model modified survivor function as well as the survivor function derived under the CoxPH model. The feature data 520 may include data relating to the associations between a particular feature and a feature set as determined by the feature manager 504. Additionally, the feature data 520 may include the estimated parameters determined by the model builder 508. Additionally, as mentioned above, the time-to-open modeling system 108 includes analytics data storage 522 which includes user data 524. User data 524 stores the features extracted from the analytics database 110 by the feature extractor 510. The features may include features associated with past recipients and used to train the survivor function. Additionally, the stored features may include features associated with a potential recipient and used to estimate a time-to-open for the potential recipient.

FIG. 6 illustrates a data table summarizing and comparing test results of several modeling systems including multiple embodiments of the time-to-open modeling system 108. In particular, the table in FIG. 6 provides results obtained from testing five modeling systems on a large dataset comprising approximately 2.04 million recipients and 22.73 million emails spanning a time frame of three weeks. In testing the models, data from the first two weeks is used to train the survivor function, which is then used to estimate times-to-open for the final week.

The models tested include the Baseline (B), Logistic Regression (LR), CoxPH Model where the relative hazard used is $\exp(\beta^T X_i)$ (CPH-L), a CoxPH Model where the relative hazard is derived from a gradient boosting machine (CPH-G), and the Mixture Model (MM). In particular, the Baseline is the historical open rate of the corresponding recipient and the corresponding time-to-open is a constant prediction equal to the censoring window. The LR model is only relevant when classifying whether or not a potential recipient is prone to opening an electronic message. The CPH-L model is the model described above with regards to deriving the survivor function under a CoxPH model to provide an estimation of a time-to-open for a potential recipient over a continuous time scale in accordance with one or more embodiments. The CPH-L defines the relative hazard to be $\psi(X_i)=\exp(\beta^T X_i)$ and assumes a linear scaling of the relative (log) hazards of different recipients with respect to the values of the features. The likelihood function used to estimate the parameters for the CoxPH survivor function is optimized under this assumption. CPH-G optimizes the likelihood function for scenarios where the effect of the features is non-linear. This is still a CoxPH model and falls within the survival analysis, but $\psi(X_i)$ is taken to be the output of a gradient boosting machine. Finally, the MM includes the overall survivor function resulting from introducing the mixture probability into the function under the CoxPH model in accordance with one or more embodiments. The Mixture Model accounts for the portion of recipients who are predicted not to open an electronic message.

Additionally, the LR and CPH-L were trained using an Elastic Net regularization penalty to the corresponding likelihoods. Further, values of the hyper-parameters $\lambda$ (the strength of the regularization) and $\alpha$ (trading off L1 vs L2) were chosen via use of the dataset. In particular, the hyper-parameters represented are those associated with the highest AUC values, rather than the lowest MRAD values. In other words, classification as to whether the recipients are prone to opening the email was prioritized over the time-to-open estimation. Additionally, the equivalent parameters of the CPH-G model were similarly chosen.

The models were evaluated using AUC and Mean Relative Absolute Deviation (MRAD) metrics. AUC measures how well each model predicts whether or not a recipient will open an electronic message. The higher the AUC values, the better the model is at classifying the recipient. MRAD measures the deviation between what was observed and what was predicted with regards to the time-to-open. Therefore, lower MRAD values show less deviation and thus, a better prediction. MRAD(A) refers to the metric as calculated for all individuals in the data set. MRAD(O) refers to the metric as calculated only for those individuals who were observed to have opened the electronic message (i.e., $\delta_i=1$). In general, the MRAD between the actual value, $t_1$, for the time-to-open and the predicted value, $\hat{t}_i$, is defined by $$MRAD = \frac{1}{N}\sum_i \frac{|t_i - \hat{t}_i|}{t_i} \quad (14)$$

As illustrated in FIG. 6, the models are tested and compared across three different censoring windows: three, six, and twelve hours. The test evaluated the time-to-open modeling system at $\hat{t}_i(5)$ corresponding to the time where the time-to-open modeling system 108 estimated that there was a 5% chance that the recipient would open the electronic message by that time (i.e., the recipient had a survival probability of 0.95 at that time). Because the LR model is only applicable for classifying whether or not a recipient is prone to opening an electronic message, the model provides no data for the MRAD(A) and MRAD(O) metrics.

From the data provided in FIG. 6, it can be seen that the LR model exhibits high AUC values, indicating the benefit of its use in estimating the probability of whether or not a potential recipient will be prone to opening an electronic message. However, the LR model is unable to provide predictors of time to open. As shown, the MM provides the best results overall. Although the AUC values of MM are similar to those of the LR, CPH-L, and CPH-G models, MM provides the lowest MRAD values for both MRAD(A) and MRAD(O), indicating that the time-to-open estimates were the most accurate under that model. However, comparing the CPH-L and CPH-G results to the baseline results shows that the CoxPH models are also a significant improvement over the baseline. Further, as the censoring window increases, the AUC values improve under each model, because more individuals are observed opening the email. The improved AUC values show that the models may predict that certain recipients are likely to open the email, but those recipients may not open the email until much later after the email has been received.

One of the characteristics of the electronic messages, as mentioned above, is a high percentage of censored observations. This is manifested by the fact that the survival curves for recipients of electronic messages routinely flatten well before they reach $S_i(t)=0:5$, as shown in the survival curve of FIG. 4B. Thus, across different settings and models, using a large value for p in equation 13 above provides sufficient fidelity for predicting the probability of opening an electronic message.

Table 1 below shows how the MRAD(O) changes for all of the tested models as the percentile p is altered. The first column corresponds to the largest time when $S_i(t)$ is greater than 0.95 (the probability that the electronic message will be opened after time (5) was greater than 0.95 for each recipient). Note that the AUC values remain constant by design, and therefore are not displayed. In general as p is reduced, all $\hat{t}(p)$ becomes equal to the time of the censored window after a certain p. The point at which the MRAD(O) values appear to reach the maximum is indicative of where the corresponding saturation region is in the survival curve. As shown, MM is most closely modeling the data (i.e., there is 95% of the population that never opens their electronic messages and the survival curve for MM arrests its drop around p=5 percentile).

TABLE 1

| Censoring Window | Model | MRAD(O) | | | | | |
|---|---|---|---|---|---|---|---|
| | | $\hat{t}(5)$ | $\hat{t}(10)$ | $\hat{t}(25)$ | $\hat{t}(50)$ | $\hat{t}(75)$ | $\hat{t}(90)$ |
| 3 hours | CPH-L | 11.952 | 12.608 | 13.929 | 16.744 | 23.462 | 25.716 |
| | CPH-G | 12.217 | 14.593 | 18.501 | 25.407 | 26.629 | 26.641 |
| | MM | 9.499 | 26.641 | 26.641 | 26.641 | 26.641 | 26.641 |
| 6 hours | CPH-L | 23.245 | 17.456 | 18.857 | 19.870 | 27.041 | 34.542 |
| | CPH-G | 14.788 | 19.588 | 26.233 | 30.970 | 38.102 | 40.602 |
| | MM | 9.832 | 12.483 | 40.602 | 40.602 | 40.602 | 40.602 |
| 12 hours | CPH-L | 19.831 | 34.632 | 27.229 | 32.510 | 40.356 | 40.750 |
| | CPH-G | 28.978 | 31.866 | 29.986 | 34.590 | 57.086 | 61.040 |
| | MM | 15.657 | 21.705 | 62.545 | 62.740 | 62.740 | 62.740 |

In addition to high accuracy and accurate modeling, the MM model is also stable. In particular, Table 2 below shows the results of tests of the sensitivity of the various models.

More specifically, an experiment was performed in which each model was fit to bootstrap samples of the training data and AUC and MRAD(O) metrics were determined. The hyper-parameter values used were the parameters used above in connection with FIG. 6. Table 2 show the mean and standard deviation for the metrics across the samples.

TABLE 2

| Censoring Window | Model | AUC Mean | AUC StdDev | MRAD(O) Mean | MRAD(O) StdDev |
|---|---|---|---|---|---|
| 3 hours | LR | 0.931 | 4e−5 | N/A | |
| | CPH-L | 0.931 | 2e−5 | 13.579 | 1.913 |
| | CPH-G | 0.929 | 8e−3 | 13.746 | 0.743 |
| | MM | 0.929 | 3e−4 | 9.277 | 1.854 |
| 6 hours | LR | 0.939 | 4e−5 | N/A | |
| | CPH-L | 0.939 | 1e−5 | 20.301 | 2.486 |
| | CPH-G | 0.939 | 3e−4 | 19.208 | 0.798 |
| | MM | 0.938 | 2e−4 | 9.753 | 1.194 |
| 12 hours | LR | 0.948 | 4e−5 | N/A | |
| | CPH-L | 0.948 | 7e−5 | 38.143 | 3.333 |
| | CPH-G | 0.949 | 2e−4 | 29.455 | 1.071 |
| | MM | 0.948 | 2e−4 | 15.444 | 1.683 |

As shown by Table 2, when comparing across models for a given censoring window, the MM provides the lowest mean of MRAD values, with standard deviations being marginally higher than that of CPH-G, indicating that the MM is stable.

In addition to the foregoing, the various models of the present disclosure continue to be predictive into the future. This reduces the need to regularly build/train the models, which reduces computer processing and memory requirements. Table 3 below shows the results of the experiments across out of time datasets. As shown, with the correct choice of percentile p, the MM obtains prediction accuracy that is better than the other models. In particular, the $5^{th}$ percentile is shown to be the best predictor for time-to-open.

TABLE 3

| Censoring Window | Model | AUC Test 1 | AUC Test 2 | MRAD(O) Test 1 | MRAD(O) Test 2 |
|---|---|---|---|---|---|
| 3 hours | LR | 0.920 | 0.937 | N/A | |
| | CPH-L | 0.920 | 0.937 | 13.210 | 10.099 |
| | CPH-G | 0.917 | 0.934 | 15.946 | 13.787 |
| | MM | 0.919 | 0.935 | 10.021 | 7.381 |
| 6 hours | LR | 0.932 | 0.944 | N/A | |
| | CPH-L | 0.932 | 0.944 | 16.712 | 23.227 |
| | CPH-G | 0.929 | 0.940 | 17.524 | 18.339 |
| | MM | 0.931 | 0.942 | 12.753 | 9.340 |
| 12 hours | LR | 0.938 | 0.952 | N/A | |
| | CPH-L | 0.939 | 0.952 | 28.096 | 29.131 |
| | CPH-G | 0.937 | 0.950 | 25.445 | 21.080 |
| | MM | 0.937 | 0.951 | 18.485 | 11.653 |

Figure 7:
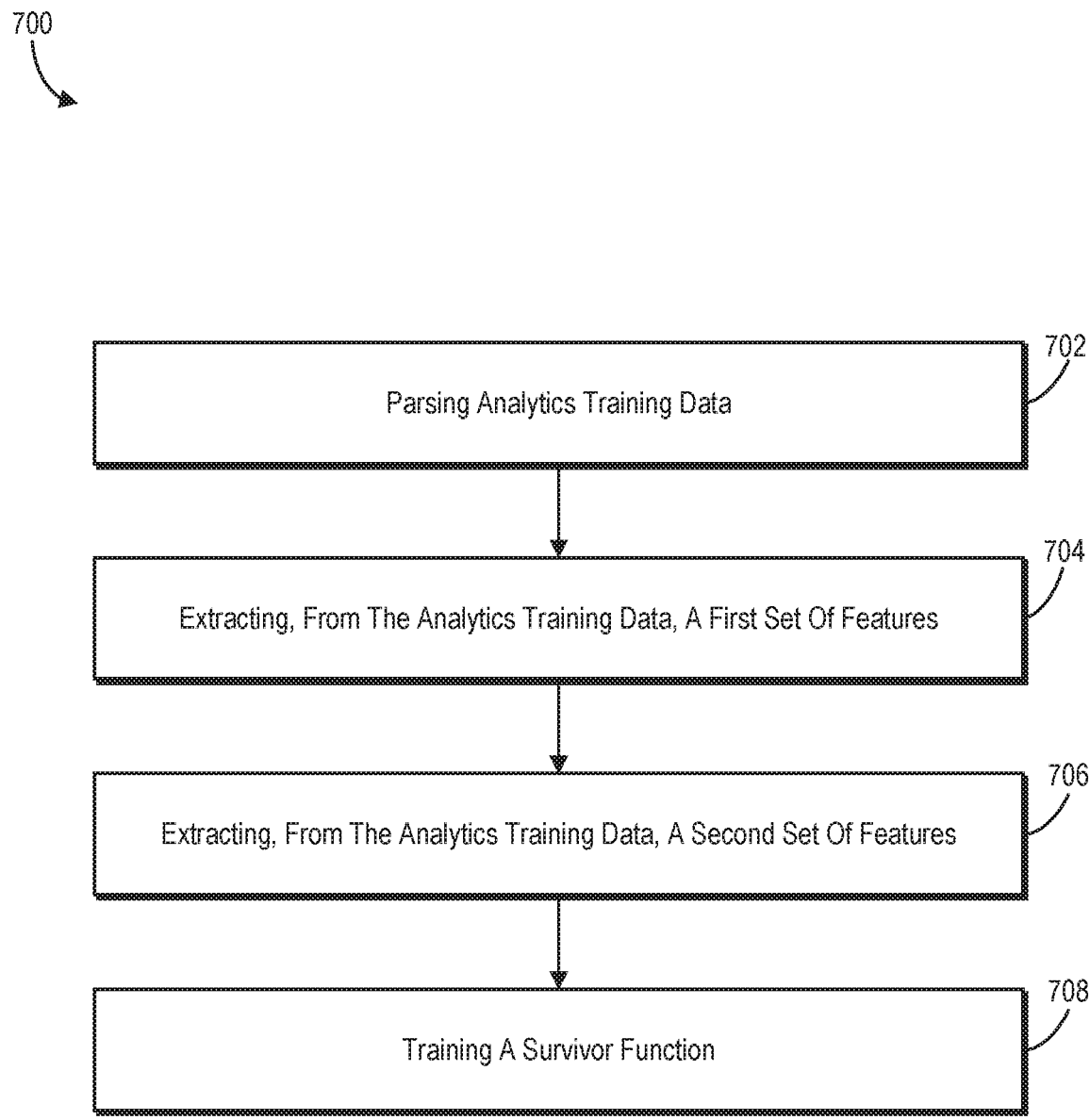
FIG. 7 illustrates a flowchart of a series of acts used to train a survivor function in accordance with one or more embodiments.

Turning now to FIG. 7, this figure illustrates a series of acts 700 to train a survivor function to predict a time-to-open for a potential recipient of an electronic message. While FIG. 7 illustrates acts according to one embodiment, alternative embodiments may omit, add to, reorder, and/or modify any of the acts shown in FIG. 7. The acts of FIG. 7 can be performed as part of a method. In one or more embodiments, a non-transitory computer readable storage medium can comprise instructions that, when executed by one or more processors, cause a computing device to perform the acts of FIG. 7. In still further embodiments, a system can perform the acts of FIG. 7.

The series of acts 700 includes an act 702 of parsing analytics training data. For example, act 702 involves accessing analytics training data stored in an analytics database and parsing through the data. The analytics training data, for example, may be stored on analytics database 110 of FIG. 1. The analytics training data comprises data associated with past recipients of electronic messages. In one or more embodiments, the analytics training data includes data provided directly by the past recipients, such as data provided by the past recipients when filling out a profile for an electronic messaging application (e.g., electronic messaging application 114 of FIG. 1). Additionally, or alternatively, the analytics training data includes data obtained by the time-to-open modeling system 108 by tracking interactions of the past recipients with received electronic messages.

The series of acts 700 also includes an act 704 of extracting, from the analytics training data, a first set of features. For example, act 704 involves extracting, from the analytics training data, a first set of features that affects whether the recipients opened an electronic message of the electronic messages by a specified time. The first set of features may include any feature determined by the time-to-open modeling system 108 to affect the time within which the recipients opened the message. Alternatively, the feature set may be limited to only those features exhibiting a non-trivial impact on the time-to-open.

The series of acts 700 also includes an act 706 of extracting, from the analytics training data, a second set of features. For example, act 706 involves extracting, from the analytics database, a second set of features that affects whether the recipients opened the electronic message. The second set of features may include any feature determined by the time-to-open modeling system 108 to affect whether or not the recipients opened the message. Alternatively, the second set of features may be limited to only those features exhibiting a non-trivial impact on whether or not the recipient opened the message.

Additionally, in one or more embodiments, the first set of features and the second set of features may be the same. In one or more embodiments, the first set of features and the second set of features share at least a subset of features. In particular, in one or more embodiments, the first set and the second set of features each comprise one or more of the age of the recipients, one or more interests of the recipients, the geographic locations of the recipients, and the occupations of the recipients, the send time of the electronic message, the date on which the recipients subscribed to receive electronic messages from a sender of the electronic messages, the number of electronic messages received by the recipients, the number of electronic messages opened by the recipients, the number of links contained in the electronic messages clicked by the recipients, or the past open rate of the recipients.

Additionally, in one or more embodiments, the time-to-open modeling system 108 also extracts, from the analytics data, outcome data that describes the interactions of the recipients with the electronic messages. For example, in one or more embodiments, the outcome data indicates whether or not the recipients actually opened the electronic message. Further, the outcome data may indicate the survival time of each recipient, wherein the survival time describes the time that elapsed before the recipients opened the electronic message. Additionally, in one or more embodiments, the time-to-open modeling system 108 may generate an indicator variable, based on the outcome data, describing whether the recipients opened the electronic message within a predetermined censoring window.

The series of acts 700 also includes an act 708 of training a survivor function. For example, act 708 involves training, using the extracted first and second set of features, a survivor function to predict whether a potential recipient will open an electronic message and a time at which the potential recipient will open the electronic message. Act 708 can involve generating a survival analysis mixture model that accounts for a proportion of the recipients not opening the electronic messages and learning parameters of the survival analysis mixture model. In particular, act 708 can involve generating a survival analysis mixture model involves introducing a mixture probability into the survivor function. The mixture probability comprises a probability that a recipient will open an electronic message given the second set of features. In one or more embodiments, act 708 also involves using outcome data describing whether the recipients opened the message, outcome data describing the survival time of the recipients, and an indicator variable generated by the time-to-open modeling system to learn parameters for the survival analysis mixture model. For example, in one or more embodiments, act 708 involves learning parameters maximizing the likelihood of the outcome data given the first and second set of features, outcome data describing whether the recipients opened the electronic message, outcome data describing the time that elapsed before the recipients opened the electronic message, and the indicator variable.

Figure 8:
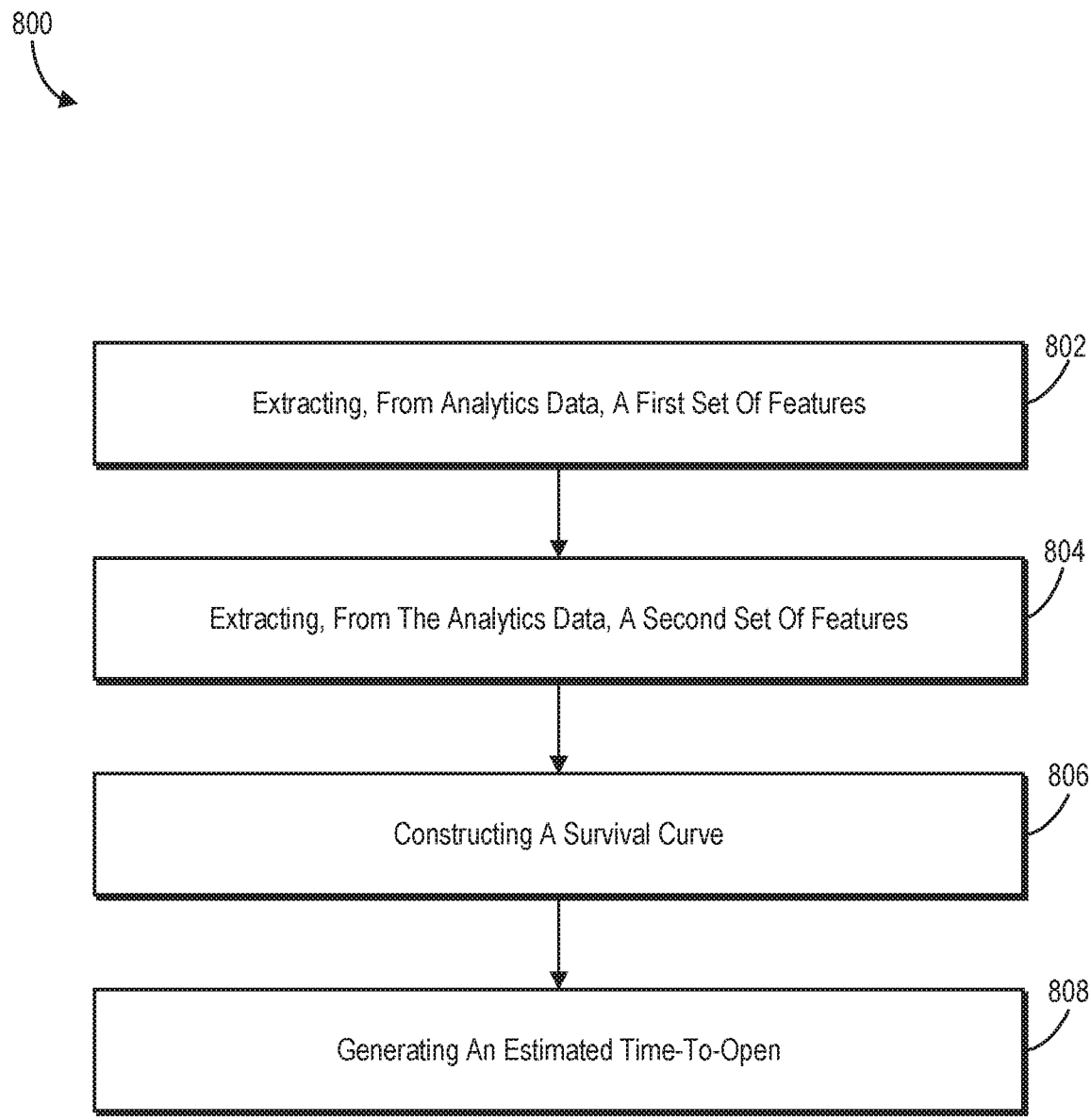
FIG. 8 illustrates a flowchart of a method of applying a trained survivor function to a potential recipient in accordance with one or more embodiments.

Turning now to FIG. 8, this figure illustrates an exemplary series of acts 800 that may be used by the time-to-open modeling system 108 to apply a trained survivor function to a potential recipient of an electronic message in accordance with one or more embodiments. In one or more embodiments, the survivor function applied in series of acts 800 is previously trained using series of acts 700 illustrated in FIG. 7. While FIG. 8 illustrates acts according to one embodiment alternative embodiments may omit, add to, reorder, and/or modify any of the acts shown in FIG. 8. The acts of FIG. 7 can be performed as part of a method. In one or more embodiments, a non-transitory computer readable storage medium can comprise instructions that, when executed by one or more processors, cause a computing device to perform the acts of FIG. 8. In still further embodiments, a system can perform the acts of FIG. 8.

The acts 800 includes an act 802 of extracting, from analytics data, a first set of features. For example, act 802 involves extracting, from analytics data associated with a potential recipient of an electronic message, a first set of features for the potential recipient that affects whether the potential recipient will open the electronic message within a given time period. In one or more embodiments, the analytics data is stored in an analytics database, such as the analytics database 110 of FIG. 1 Further, the analytics data may include data provided by the potential recipient, as well as data obtained from tracking the prior interactions of the potential recipient with electronic messages.

The series of acts 800 also includes an act 804 of extracting, from analytics data, a second set of features. For example, act 804 involves extracting, from the analytics data, a second set of features for the potential recipient that affects a probability that the potential recipient will open the electronic message. In one or more embodiments, the second set of features is the same as the first set of features. In one or more alternative embodiments, the first and second sets of features share at least a subset of common features. The features included in the first and second sets of features may comprise any feature deemed relevant to the outcome corresponding to the feature set and may include those features described with reference to FIG. 7.

The series of acts 800 also includes an act 806 of constructing a survival curve. For example, act 806 involves constructing a survival curve for the potential recipient that estimates a probability that the potential recipient will not open the electronic message by a specified time on a continuous time scale using the first set of features, the second set of features, and a survivor function with a mixture probability. The mixture probability estimates a probability of whether the potential recipient will open the electronic message based on the second set of features. In one or more embodiments, time-to-open modeling system 108 generates a latent indicator variable associated with the potential recipient, wherein the latent indicator variable classifies the potential recipient based on the probability of whether the potential recipient will open the electronic message. For example, if the potential recipient is predicted to open the electronic message, the latent indicator variable may take on the value of 1. Otherwise, the latent indicator variable may take on the value of 0.

In one or more embodiments, generating the survival curve further includes generating a Cox PH survivor function using Cox PH regression based on the first set of features, generating a mixture probability based on the second set of features, and incorporating the mixture probability into the Cox PH survivor function. The Cox PH modeling allows the survivor function to incorporate effects of the first set of features on the time within which the potential recipient will open the electronic message. The mixture probability allows the survivor function to incorporate the effects of the second set of features on whether or not the potential recipient will actually open the message. Further, in one or more embodiments, using the first and second sets of features involves applying first learned parameters affecting the impact of the first set of features and second learned parameters affecting the impact of the second set of features. The first and second learned parameters may be learned by the time-to-open modeling system 108 when training the survivor function, such as when training the survivor function using the series of acts 700.

The series of acts 800 also includes an act 808 of generating an estimated time-to-open. For example, act 808 involves generating an estimated time that the potential recipient will open the electronic message using the constructed survival curve. In one or more embodiments, the time-to-open modeling system 108 will generate the estimated time by determining a desired probability that the potential recipient will open the electronic message and locating a corresponding time on the survival curve. In one or more alternative embodiments, the time-to-open modeling system 108 will generate the estimated time by determining a desired time by which the electronic message will be opened and locating the corresponding probability that the potential recipient will open the electronic message within the desired time on the survival curve. In one or more embodiments, determining the desired time may include determining a time sensitivity of the electronic message and determining a time limit within which the electronic message will be opened based on the time sensitivity.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the font recognition system to train and employ a hybrid font recognition neural network, as described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
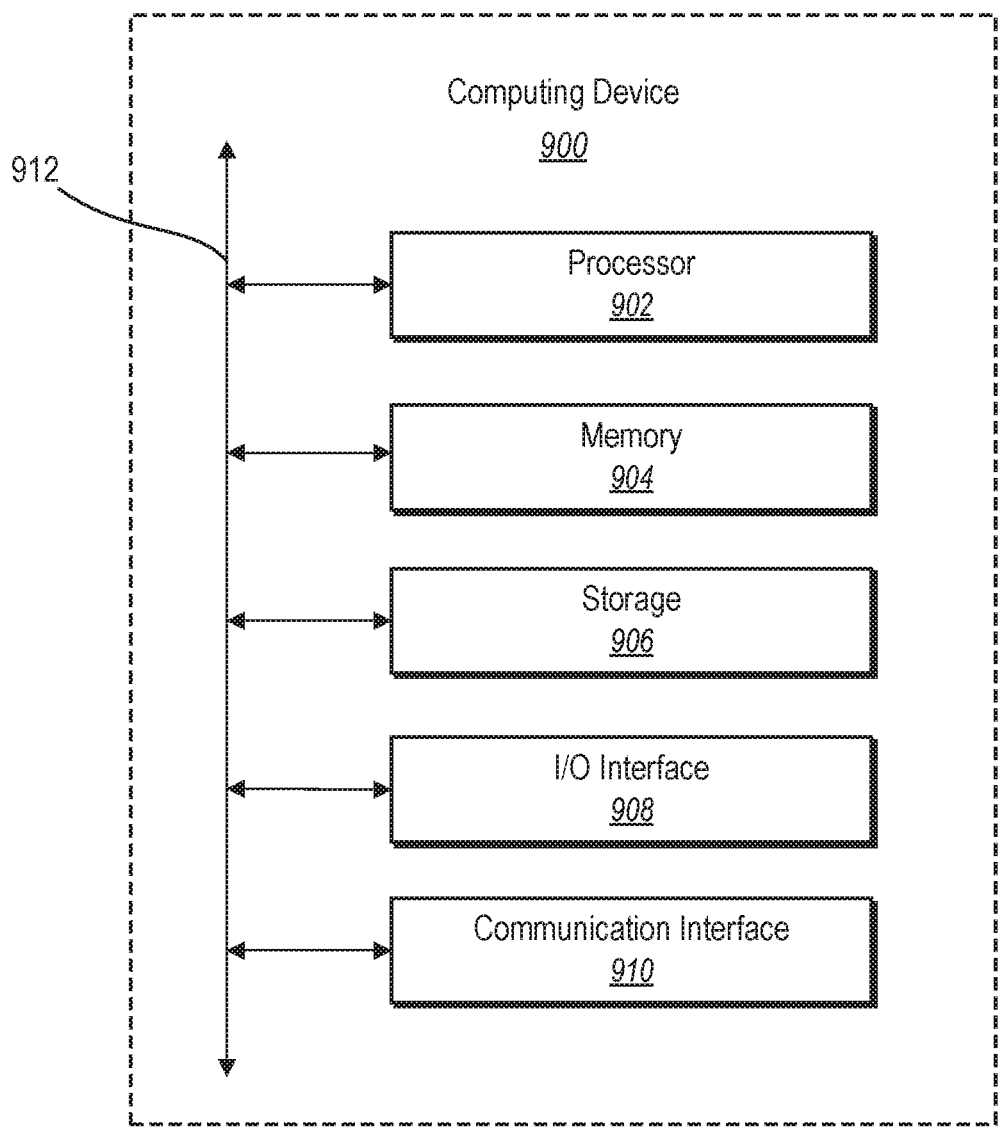
FIG. 9 illustrates a block diagram of an exemplary computing device in accordance with one or more embodiments.

FIG. 9 illustrates a block diagram of an exemplary computing device 900 that may be configured to perform one or more of the processes described above. One will appreciate that one or more computing devices, such as the computing device 900 may represent the computing devices described above (e.g., computing device 112*a*-112*n*, server device(s) 104). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output ("I/O") interfaces 908, and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment in which electronic communications are exchanged between devices over networks, a method for training a function to predict a time-to-open of electronic communications, comprising:

accessing analytics training data associated with a plurality of potential recipients of electronic messages;

extracting, from the analytics training data, a first set of features that affects whether the plurality of potential recipients opened an electronic message of the electronic messages by a specified time;

extracting, from the analytics training data, a second set of features for the plurality of potential recipients that affects a probability that the plurality of potential recipients will open the electronic message at all;

constructing a survival curve for the plurality of potential recipients that estimates a probability that the plurality of potential recipients will not open the electronic message by a specified time on a continuous time scale using a mixture model modified survivor function that jointly models whether the plurality of potential recipients is prone to opening the electronic message at all and a time-to-open based on the first set of features, the second set of features, and a mixture probability;

generating an estimated time that the plurality of potential recipients will open the electronic message using the constructed survival curve;

generating, based on the survival curve and the estimated times, a list of a subset of the plurality of potential recipients that meet a condition for a time sensitive electronic message, the condition comprising at least one of a percent chance that a potential recipient will open the electronic message by a predetermined time or a percent chance that the potential recipient will open the electronic message at all; and sending the time sensitive electronic message to the potential recipients on the list.

2. The method of claim 1, wherein generating the estimated time that the potential recipient will open the electronic message using the constructed survival curve comprises determining a desired probability that the potential recipient will open the electronic message and locating a corresponding time on the constructed survival curve.

3. The method of claim 1, wherein generating the estimated time that the potential recipient will open the electronic message using the constructed survival curve comprises determining a desired time by which the electronic message will be opened and locating a corresponding probability that the potential recipient will open the electronic message within the desired time on the constructed survival curve.

4. The method of claim 3, wherein determining the desired time by which the electronic message will be opened comprises:
  determining a time sensitivity of the electronic message; and
  determining a time limit within which the electronic message will be opened based on the determined time sensitivity.

5. The method of claim 1, wherein the first set of features and the second set of features share at least a subset of common features.

6. The method of claim 1, wherein the first set of features and the second set of features each comprises one or more of:
  an age of the plurality of potential recipients;
  one or more interests of the plurality of potential recipients;
  a geographic location of the plurality of potential recipients;
  an occupation of the plurality of potential recipients;
  a send time of the electronic message;
  a date on which the plurality of potential recipients subscribed to receive electronic messages from a sender of the electronic messages;
  a number of electronic messages received by the plurality of potential recipients;
  a number of electronic messages opened by the plurality of potential recipients;
  a number of links contained in the electronic messages clicked by the plurality of potential recipients; or
  a past open rate of the plurality of potential recipients.

7. The method of claim 1, further comprising extracting, from the analytics training data, outcome data comprising:
  whether the plurality of potential recipients opened the electronic message; and
  a survival time of the plurality of potential recipients, wherein the survival time describes a time that elapsed before the plurality of potential recipients opened the electronic message.

8. A non-transitory computer readable storage medium including a set of instructions that, when executed by at least one processor, cause a computing device to:
  extract, from analytics data associated with a plurality of potential recipients of an electronic message, a first set of features for the plurality of potential recipients that affects whether the plurality of potential recipients will open the electronic message within a given time period;
  extract, from the analytics data, a second set of features for the plurality of potential recipients that affects a probability that the plurality of potential recipients will open the electronic message at all;
  construct a survival curve for the plurality of potential recipients that estimates a probability that the plurality of potential recipients will not open the electronic message by a specified time on a continuous time scale using a mixture model modified survivor function that jointly models whether the plurality of potential recipients is prone to opening the electronic message at all and a time-to-open based on the first set of features, the second set of features, and a mixture probability;
  generate an estimated time that the plurality of potential recipients will open the electronic message using the constructed survival curve;
  generate, based on the survival curve and the estimated times, a list of a subset of the plurality of potential recipients that meet a condition for a time sensitive electronic message, the condition comprising at least one of a percent chance that a potential recipient will open the electronic message by a predetermined time or a percent chance that the potential recipient will open the electronic message at all; and
  send the time sensitive electronic message to the potential recipients on the list.

9. The non-transitory computer readable storage medium of claim 8, wherein the set of instructions, when executed by the at least one processor causes the computing device to generate the estimated time that the potential recipient will open the electronic message using the constructed survival curve by determining a desired probability that the potential recipient will open the electronic message and locating a corresponding time on the constructed survival curve.

10. The non-transitory computer readable storage medium of claim 8, wherein the set of instructions, when executed by the at least one processor causes the computing device to generate the estimated time that the potential recipient will open the electronic message using the constructed survival curve by determining a desired time by which the electronic message will be opened and locating a corresponding probability that the potential recipient will open the electronic message within the desired time on the constructed survival curve.

11. The non-transitory computer readable storage medium of claim 10, wherein determining the desired time by which the electronic message will be opened comprises:
  determining a time sensitivity of the electronic message; and
  determining a time limit within which the electronic message will be opened based on the determined time sensitivity.

12. The non-transitory computer readable storage medium of claim 8, wherein the set of instructions, when executed by the at least one processor causes the computing device to estimates a probability of whether the potential recipient will open the electronic message based on the second set of features.

13. The non-transitory computer readable storage medium of claim 12, wherein the set of instructions, when executed by the at least one processor, further cause the computing device to generate a latent indicator variable associated with the potential recipient, wherein the latent indicator variable classifies the potential recipient based on the probability of whether the potential recipient will open the electronic message.

14. The non-transitory computer readable storage medium of claim 8, wherein constructing the mixture model modified survivor function comprises estimating values for a vector of parameters that affect a dependence of time for a recipient to open to open the electronic message based on the first set of features by maximizing a likelihood function corresponding to the mixture model modified survivor function using a gradient based method.

15. The non-transitory computer readable storage medium of claim 14, wherein using the mixture model modified survivor function further comprises:
applying first learned parameters affecting an impact of the first set of features; and
applying second learned parameters affecting an impact of the second set of features.

16. The non-transitory computer readable storage medium of claim 8, wherein the analytics data comprises:
data provided by the potential recipient; and
data obtained from tracking prior interactions with electronic messages by the potential recipient.

17. A system for training a survivor function to predict a time to open of an electronic communication, comprising:
a memory component comprising:
analytics training data associated with a plurality of potential recipients of electronic messages;
at least one server; and
at least one non-transitory computer readable storage medium storing instructions thereon that, when executed by the at least one server, cause the system to:
parse the analytics training data;
extract, from the analytics training data, a first set of features that affects whether the plurality of potential recipients opened an electronic message of the electronic messages by a specified time;
extract, from the analytics training data, a second set of features that affects whether the plurality of potential recipients opened the electronic message at all;
construct a survival curve for the plurality of potential recipients based on the first set of features, the second set of features, and a mixture probability that estimates a probability that the plurality of potential recipients will not open the electronic message by a specified time on a continuous time scale using a mixture model modified survivor function to jointly model whether a plurality of potential recipients will open an electronic message at all and a time at which the plurality of potential recipients will open the electronic message, by accounting for a proportion of the plurality of potential recipients not opening the electronic messages and learning parameters of the mixture model modified survivor function;
generate an estimated time that the plurality of potential recipients will open the electronic message using the mixture model modified survivor function;
generate, based on the survival curve and the estimated times, a list of a subset of the plurality of potential recipients that meet a condition for a time sensitive electronic message, the condition comprising at least one of a percent chance that a potential recipient will open the electronic message by a predetermined time or a percent chance that the potential recipient will open the electronic message at all; and
send the time sensitive electronic message to the potential recipients on the list.

18. The system of claim 17, further comprising instructions that, when executed by the at least one server, cause the system to:
extract outcome data describing whether the plurality of potential recipients opened the electronic message;
extract additional outcome data describing a survival time of the plurality of potential recipients, wherein the survival time describes the time that elapsed before the plurality of potential recipients opened the electronic message; and
generate an indicator variable describing whether the plurality of potential recipients opened the electronic message within a predetermined censoring window.

19. The system of claim 18, further comprising instructions that, when executed by the at least one server, cause the system to further train the survivor function by using the outcome data describing whether the plurality of potential recipients opened the electronic message, the additional outcome data describing the survival time of the plurality of potential recipients, and the indicator variable.

20. The system of claim 18, further comprising instruction that, when executed by the at least one server, cause the system to train the mixture model modified survivor function by learning the parameters of the mixture model modified survivor function by maximizing a likelihood of the outcome data and the additional outcome data given:
the first and second set of features;
the outcome data describing whether the plurality of potential recipients opened the electronic message;
the additional outcome data describing the time that elapsed before the plurality of potential recipients opened the electronic message; and
the indicator variable.

* * * * *